US012762838B2

(12) United States Patent
Azad et al.

(10) Patent No.: US 12,762,838 B2
(45) Date of Patent: Oct. 13, 2026

(54) SYSTEM AND METHOD FOR PROCESSING ENDOSCOPY IMAGES IN REAL TIME WITH OBJECT DETECTION AND ANNOTATION

(71) Applicant: A.I. VALI Inc., Annan (CA)

(72) Inventors: Azar Azad, Annan (CA); Bo Xiong, Surrey (CA); David Armstrong, Hamilton (CA); Qiyin Fang, Grimsby (CA); David Fleet, Toronto (CA); Micha Livne, North York (CA)

(73) Assignee: A.I. VALI Inc., Annan (CA)

(*) Notice: Subject to any disclaimer, the term of this patent is extended or adjusted under 35 U.S.C. 154(b) by 251 days.

(21) Appl. No.: 18/576,302

(22) PCT Filed: Jul. 4, 2022

(86) PCT No.: PCT/CA2022/051054
§ 371 (c)(1),
(2) Date: Jan. 3, 2024

(87) PCT Pub. No.: WO2023/279199
PCT Pub. Date: Jan. 12, 2023

(65) Prior Publication Data

US 2024/0331354 A1 Oct. 3, 2024

Related U.S. Application Data

(60) Provisional application No. 63/218,357, filed on Jul. 4, 2021.

(51) Int. Cl.
*G06V 10/25* (2022.01)
*G06V 10/44* (2022.01)
(Continued)

(52) U.S. Cl.
CPC ............ *G06V 10/764* (2022.01); *G06V 10/25* (2022.01); *G06V 10/44* (2022.01); *G06V 10/82* (2022.01);
(Continued)

(58) Field of Classification Search
CPC ...... G06V 10/764; G06V 10/25; G06V 10/44; G06V 10/82; G06V 20/70; G06V 2201/07;
(Continued)

(56) References Cited

U.S. PATENT DOCUMENTS

| | | |
|---|---|---|
| 8,443,279 B1 | 5/2013 | Hameed et al. |
| 8,502,876 B2 | 8/2013 | Wang et al. |

(Continued)

FOREIGN PATENT DOCUMENTS

| | | |
|---|---|---|
| CN | 101203170 B | 11/2015 |
| CN | 110599448 A | 12/2019 |

(Continued)

OTHER PUBLICATIONS

Poon et al., AI-doscopist: a real-time deep-learning-based algorithm for localising polyps in colonoscopy videos with edge computing devices, Digital Medicine (2020) 3:73 ; https://doi.org/10.1038/s41746-020-0281-z (8 pages).

(Continued)

*Primary Examiner* — Juan M Guillermety
(74) *Attorney, Agent, or Firm* — SMART & BIGGAR LP; Tonino Rosario Orsi

(57) ABSTRACT

Various embodiments are described herein for a system for analyzing images and speech obtained during a medical diagnostic procedure for automatically generated annotated images using annotation data for one or more images having at least one object of interest (OOI) and a classification where the annotation data includes text that is gen-
(Continued)

erated from speech provided by the user commenting on the one or more images having the at least one OOI.

35 Claims, 18 Drawing Sheets

(51) Int. Cl.

*G06V 10/764* (2022.01)
*G06V 10/82* (2022.01)
*G06V 20/70* (2022.01)
*G10L 15/26* (2006.01)

(52) U.S. Cl.

CPC .............. *G06V 20/70* (2022.01); *G10L 15/26* (2013.01); *G06V 2201/07* (2022.01)

(58) Field of Classification Search

CPC .... G10L 15/26; G06N 3/0455; G06N 3/0464; G06N 3/048; G06N 3/088; G06N 3/0895; G06N 3/09; G06T 2207/10016; G06T 2207/10024; G06T 2207/10068; G06T 7/0012; G06T 2207/20076; G06T 2207/20081; G06T 2207/20084; G06T 2207/30032; A61B 1/000096; G16H 15/00; G16H 20/40; G16H 30/20; G16H 40/63; G16H 50/20; G16H 50/70; G16H 30/40

See application file for complete search history.

(56) References Cited

U.S. PATENT DOCUMENTS

| | | | |
|---|---|---|---|
| 10,055,843 | B2 | 8/2018 | Tajbakhsh et al. |
| 10,102,444 | B2 | 10/2018 | Kim et al. |
| 10,682,108 | B1 | 6/2020 | Ma et al. |
| 10,733,745 | B2 | 8/2020 | Pizer et al. |
| 10,841,514 | B2 | 11/2020 | Sachdev et al. |
| 11,830,607 | B2 | 11/2023 | Smith et al. |
| 11,894,114 | B2 * | 2/2024 | Paik ........................ G06F 18/41 |
| 12,094,018 | B1 * | 9/2024 | O'Malley .............. G06N 20/00 |
| 12,182,999 | B2 | 12/2024 | Byun et al. |
| 2013/0249783 | A1 | 9/2013 | Sonntag |
| 2019/0046007 | A1 | 2/2019 | Schwartz et al. |
| 2019/0147331 | A1 * | 5/2019 | Arditi .................. G06N 3/0475 706/20 |
| 2019/0380792 | A1 | 12/2019 | Poltaretskyi et al. |
| 2020/0020098 | A1 | 1/2020 | Odry et al. |
| 2020/0035350 | A1 | 1/2020 | Sullivan et al. |
| 2020/0074629 | A1 | 3/2020 | Zur |
| 2020/0160997 | A1 | 5/2020 | Bagci et al. |
| 2020/0258627 | A1 | 8/2020 | Setegn et al. |
| 2020/0320135 | A1 * | 10/2020 | Li .......................... H04M 1/725 |
| 2020/0371744 | A1 | 11/2020 | Liao |
| 2021/0049353 | A1 | 2/2021 | Bian et al. |
| 2021/0056691 | A1 * | 2/2021 | Gernand ................ G16H 30/40 |
| 2021/0090694 | A1 | 3/2021 | Lau et al. |
| 2021/0090736 | A1 * | 3/2021 | Innanje ................ G06N 3/0464 |
| 2021/0158796 | A1 * | 5/2021 | Cherepanov ............ G10L 15/01 |
| 2022/0328173 | A1 * | 10/2022 | Mahjouri ............... G16H 30/40 |
| 2024/0177836 | A1 | 5/2024 | Paik et al. |

FOREIGN PATENT DOCUMENTS

| | | | |
|---|---|---|---|
| EP | 1493378 | A1 | 1/2005 |
| IN | 202121045730 | A | 10/2021 |
| IN | 202131052393 | A | 1/2022 |
| JP | 2005027978 | A | 2/2005 |
| JP | 2018120320 | A | 8/2018 |
| JP | 2019219591 | A | 12/2019 |
| JP | 6885517 | B1 | 6/2021 |
| KR | 1020210059638 | A | 5/2021 |
| WO | 2011005865 | A2 | 1/2011 |
| WO | 2017151778 | A1 | 9/2017 |
| WO | 2018132804 | A1 | 7/2018 |
| WO | 2019238714 | A1 | 12/2019 |
| WO | 2020121014 | A1 | 6/2020 |
| WO | 2020172414 | A1 | 8/2020 |
| WO | 2021010985 | A1 | 1/2021 |
| WO | 2021048326 | A1 | 3/2021 |
| WO | 2021067624 | A1 | 4/2021 |

OTHER PUBLICATIONS

International Search Report and Written Opinion mailed Oct. 3, 2022 in International Patent Application PCT/CA2022/051054 (26 pages).

Yang et al., Intelligent Imaging Technology in Diagnosis of Colorectal Cancer Using Deep Learning, (2019) IEEE Access, vol. 7, pp. 178839-178847 (9 pages).

* cited by examiner

SYSTEM AND METHOD FOR PROCESSING ENDOSCOPY IMAGES IN REAL TIME WITH OBJECT DETECTION AND ANNOTATION

CROSS-REFERENCE TO RELATED APPLICATION

This application claims the benefit of U.S. Provisional Patent Application No. 63/218,357 filed Jul. 4, 2021; the entire contents of U.S. Provisional Patent Application No. 63/218,357 is hereby incorporated herein in its entirety.

FIELD

Various embodiments are described herein that generally relate to a system for processing medical images in real time, as well as the methods and computer program products thereof.

BACKGROUND

The following paragraphs are provided by way of background to the present disclosure. They are not, however, an admission that anything discussed therein is prior art or part of the knowledge of persons skilled in the art.

Medical imaging provides the input required to confirm disease diagnoses, to monitor patients' responses to treatments, and in some cases, to provide treatment procedures. A number of different medical imaging modalities can be used for various medical diagnostic procedures. Some examples of medical imaging modalities include gastrointestinal (GI) endoscopy, X-rays, MRI, CT scans, ultrasound, ultrasonography, echocardiography, cystography, and laparoscopy. Each of these requires analysis to ensure proper diagnosis. The current state of the art may result in a misdiagnosis rate that can be improved upon.

For example, endoscopy is the gold standard for confirming gastrointestinal disease diagnoses, monitoring patients' responses to treatments, and, in some cases, providing treatment procedures. Endoscopy videos collected from patients during clinical trials are usually reviewed by independent clinicians to reduce biases and increase accuracy. These analyses, however, require visually reviewing the video images and manually recording the results, or manually annotating the images, which is costly, time-consuming, and difficult to standardize.

Every year, millions of patients are misdiagnosed, with nearly half of them suffering from early-stage cancer. Colorectal cancer (CRC) is the third leading cause of cancer death worldwide; however, if detected early, it can be successfully treated. Currently, clinicians manually report their diagnosis after visually analyzing endoscopy/colonoscopy video images. Endoscopy has a misdiagnosis error rate of more than 28%, which is largely due to human error. Accordingly, misdiagnosis is a major issue for healthcare systems and patients, as well as having significant socioeconomic consequences.

Conventional systems display video produced by an endoscope during an endoscopy, record the video (in rare cases), and provide no further functionality. In some cases, researchers may save the images on their desktop and use offline programs to manually draw lines around polyps or other objects of interest. However, this analysis is done after the endoscopy procedure is performed, and so the clinician is not able to rescan an area of the colon if there are any indeterminate results since the procedure has already been completed.

There is a need for a system and method that addresses the challenges and/or shortcomings described above.

SUMMARY OF VARIOUS EMBODIMENTS

Various embodiments of a system and method for processing medical images in real time, and computer products for use therewith, are provided according to the teachings herein.

In one broad aspect, in accordance with the teachings herein, there is provided, in at least one embodiment, a system for analyzing medical image data for a medical procedure, wherein the system comprises: a non-transitory computer-readable medium having stored thereon program instructions for analyzing medical image data for the medical procedure; and at least one processor that, when executing the program instructions, is configured to: receive at least one image from a series of images; determine when there is at least one object of interest (OOI) in the at least one image and, when there is at least one OOI, determine a classification for the at least one OOI, where both determinations are performed using at least one machine learning model; display the at least one image and any determined OOIs to a user on a display during the medical procedure; receive an input audio signal including speech from the user during the medical procedure and recognize the speech; when the speech is recognized as a comment on the at least one image during the medical procedure, convert the speech into at least one text string using a speech-to-text conversion algorithm; match the at least one text string with the at least one image for which the speech from the user was provided; and generate at least one annotated image in which the at least one text string is linked to the corresponding at least one image.

In at least one embodiment, the at least one processor is further configured to, when the speech is recognized as a request for at least one reference image with OOIs that have been classified with the same classification as the at least one OOI, display the at least one reference image and receive input from the user that either confirms or dismisses the classification of the at least one OOI.

In at least one embodiment, the at least one processor is further configured to, when the at least one OOI is classified as being suspicious, receive input from the user indicating a user classification for the at least one image with the undetermined OOI.

In at least one embodiment, the at least one processor is further configured to automatically generate a report that includes the at least one annotated image.

In at least one embodiment, the at least one processor is further configured to, for a given OOI in a given image: identify bounding box coordinates for a bounding box that is associated with the given OOI in the given image; calculate a confidence score based on a probability distribution of the classification for the given OOI; and overlay the bounding box on the at least one image at the bounding box coordinates when the confidence score is higher than a confidence threshold.

In at least one embodiment, the at least one processor is configured to determine the classification for the OOI by: applying a convolutional neural network (CNN) to the OOI by performing convolutional, activation, and pooling operations to generate a matrix; generating a feature vector by processing the matrix using the convolutional, activation, and pooling operations; and performing the classification of the OOI based on the feature vector.

In at least one embodiment, the at least one processor is further configured to overlay a timestamp on the corresponding at least one image when generating the at least one annotated image.

In at least one embodiment, the at least one processor is further configured to indicate the confidence score on the at least one image in real time on a display or in the report.

In at least one embodiment, the at least one processor is configured to receive the input audio during the medical procedure by: initiating receipt of an audio stream for the input audio from the user upon detection of a first user action that includes: pausing a display of the series of images; taking a snapshot of a given image in the series of images; or providing an initial voice command; and ending receipt of the audio stream upon detection of a second user action that includes: remaining silent for a pre-determined length; pressing a designated button; or providing a final voice command.

In at least one embodiment, the at least one processor is further configured to store the series of images when receiving the input audio during the medical procedure, thereby designating the at least one image to receive annotation data for generating a corresponding at least one annotated image.

In at least one embodiment, the at least one processor is further configured to generate a report for the medical procedure by: capturing a set of patient information data to be added to the report; loading a subset of the series of images that includes the at least one annotated image; and combining the set of patient information data with the subset of the series of images that includes the at least one annotated image into the report.

In at least one embodiment, the at least one processor is further configured to perform training of the at least one machine learning model by: applying an encoder to at least one training image to generate at least one feature vector for a training OOI in the at least one training image; selecting a class for the training OOI by applying the at least one feature vector to the at least one machine learning model; and reconstructing, using a decoder, a labeled training image by associating the at least one feature vector with the at least one training image and the selected class with which to train the at least one machine learning model.

In at least one embodiment, the class is a healthy tissue class, an unhealthy tissue class, a suspicious tissue class, or an unfocused tissue class.

In at least one embodiment, the at least one processor is further configured to: train the at least one machine learning model using training datasets that include labeled training images, unlabelled training images, or a mix of labelled and unlabelled training images, the images including examples categorized by healthy tissue, unhealthy tissue, suspicious tissue, and unfocused tissue.

In at least one embodiment, the at least one processor is further configured to train the at least one machine learning model by using supervised learning, unsupervised learning, or semi-supervised learning.

In at least one embodiment, the training datasets further include subcategories for each of the unhealthy tissue and the suspicious tissue.

In at least one embodiment, the at least one processor is further configured to create the at least one machine learning model by: receiving training images as input to the encoder; projecting the training images, using the encoder, into features that are part of a feature space; mapping the features, using a classifier, to a set of target classes; identifying morphological characteristics of the training images to generate a new training dataset, the new training dataset having data linking parameters to the training images; and determining whether there is one or more mapped classes or no mapped classes based on the morphological characteristics.

In at least one embodiment, the at least one processor is further configured to determine the classification for the at least one OOI by: receiving one or more of the features as input to the decoder; mapping the one of the features over an unlabelled data set using a deconvolutional neural network; and reconstructing a new training image from the one of the features using the decoder to train the at least one machine learning model.

In at least one embodiment, the at least one processor is further configured to train the speech-to-text conversion algorithm using a speech dataset, the speech dataset comprising ground truth text and audio data for the ground truth text, to compare new audio data to the speech dataset to identify a match with the ground truth text.

In at least one embodiment, the speech-to-text conversion algorithm maps the at least one OOI to one of a plurality of OOI medical terms.

In at least one embodiment, the medical image data is obtained from one or more endoscopy procedures, one or more MRI scans, one or more CT scans, one or more X-rays, one or more ultrasonographs, one or more nuclear medicine images, or one or more histology images.

In another broad aspect, in accordance with the teachings herein, there is provided, in at least one embodiment, a system for training at least one machine learning model for use with analyzing medical image data for a medical procedure and a speech-to-text conversion algorithm, wherein the system comprises: a non-transitory computer-readable medium having stored thereon program instructions for training the machine learning model; and at least one processor that, when executing the program instructions, is configured to: apply an encoder to at least one training image to generate at least one feature for a training object of interest (OOI) in the at least one training image; select a class for the training OOI by applying the at least one feature to the at least one machine learning model; reconstruct, using a decoder, a labeled training image by associating the at least one feature with the training image and the selected class with which to train the at least one machine learning model; train the speech-to-text conversion algorithm to identify matches between new audio data and ground truth text using a speech dataset comprising the ground truth text and audio data for the ground truth text, thereby generating at least one text string; and overlay the training OOI and the at least one text string on an annotated image.

In at least one embodiment, the class is a healthy tissue class, an unhealthy tissue class, a suspicious tissue class, or an unfocused tissue class.

In at least one embodiment, the at least one processor is further configured to: train the at least one machine learning model using training datasets that include labeled training images, unlabelled training images, or a mix of labelled and unlabelled training images, the images including examples categorized by healthy tissue, unhealthy tissue, suspicious tissue, and unfocused tissue.

In at least one embodiment, the at least one processor is further configured to train the at least one machine learning model by using supervised learning, unsupervised learning, or semi-supervised learning.

In at least one embodiment, the training datasets further include subcategories for each of the unhealthy tissue and the suspicious tissue.

In at least one embodiment, the at least one processor is further configured to create the at least one machine learning model by: receiving training images as input to the encoder; projecting the training images, using the encoder, into a feature space that comprises features; mapping the features, using a classifier, to a set of target classes; identifying morphological characteristics of the training images to generate a training dataset, the training dataset having data linking parameters to the training images; and determining whether there is one or more mapped classes or no mapped classes based on the morphological characteristics.

In at least one embodiment, the at least one processor is further configured to: receive one or more of the features as input to the decoder; map the one of the features over an unlabelled data set using a deconvolutional neural network; and reconstruct a new training image from the one of the features using the decoder to train the at least one machine learning model.

In at least one embodiment, the speech-to-text conversion algorithm maps the at least one OOI to one of a plurality of OOI medical terms.

In at least one embodiment, the at least one processor is further configured to: generate at least one new training image from an object of interest (OOI) detected while analyzing the medical image data when at least one text string associated with the OOI is determined to be a ground truth for that OOI based on the speech-to-text conversion algorithm producing an input audio that matches the at least one text string.

In at least one embodiment, the at least one processor is further configured to: generate at least one new training image from an object of interest (OOI) detected while analyzing the medical image data when at least one text string associated with the OOI is determined not to be a ground truth for that OOI based on the speech-to-text conversion algorithm producing an input audio that matches the at least one text string.

In at least one embodiment, the training is performed for medical image data obtained from one or more endoscopy procedures, one or more MRI scans, one or more CT scans, one or more X-rays, one or more ultrasonographs, one or more nuclear medicine images, or one or more histology images.

In another broad aspect, in accordance with the teachings herein, there is provided, in at least one embodiment, a method for analyzing medical image data for a medical procedure, wherein the method comprises: receiving at least one image from a series of images; determining when there is at least one object of interest (OOI) in the at least one image and, when there is at least one OOI, determining a classification for the at least one OOI, where both determinations are performed using at least one machine learning model; displaying the at least one image and any determined OOIs to a user on a display during the medical procedure; receiving an input audio signal including speech from the user during the medical procedure and recognizing the speech; when the speech is recognized as a comment on the at least one image during the medical procedure, converting the speech into at least one text string using a speech-to-text conversion algorithm; matching the at least one text string with the at least one image for which the speech from the user was provided; and generating at least one annotated image in which the at least one text string is linked to the corresponding at least one image.

In at least one embodiment, the method further comprises, when the speech is recognized as including a request for at least one reference image with the classification, displaying the at least one reference image with OOIs that have been classified with the same classification as the at least one OOI and receiving input from the user that either confirms or dismisses the classification of the at least one OOI.

In at least one embodiment, the method further comprises, when the at least one OOI is classified as being suspicious, receiving input from the user indicating a user classification for the at least one image with the undetermined OOI.

In at least one embodiment, the method further comprises, automatically generating a report that includes the at least one annotated image.

In at least one embodiment, the method further comprises, for a given OOI in a given image: identifying bounding box coordinates for a bounding box that is associated with the given OOI in the given image; calculating a confidence score based on a probability distribution of the classification for the given OOI; and overlaying the bounding box on the at least one image at the bounding box coordinates when the confidence score is higher than a confidence threshold.

In at least one embodiment, the method further comprises determining the classification for the OOI by: applying a convolutional neural network (CNN) to the OOI by performing convolutional, activation, and pooling operations to generate a matrix; generating a feature vector by processing the matrix using the convolutional, activation, and pooling operations; and performing the classification of the OOI based on the feature vector.

In at least one embodiment, the method further comprises overlaying a timestamp on the corresponding at least one image when generating the at least one annotated image.

In at least one embodiment, the method further comprises indicating the confidence score on the at least one image in real time on a display or in the report.

In at least one embodiment, receiving the input audio during the medical procedure comprises: initiating receipt of an audio stream for the input audio from the user upon detection of a first user action that includes: pausing a display of the series of images; taking a snapshot of a given image in the series of images; or providing an initial voice command; and ending receipt of the audio stream upon detection of a second user action that includes: remaining silent for a pre-determined length; pressing a designated button; or providing a final voice command.

In at least one embodiment, the method further comprises storing the series of images when receiving the input audio during the medical procedure, thereby designating the at least one image to receive annotation data for generating a corresponding at least one annotated image.

In at least one embodiment, the method further comprises generating a report for the medical procedure by: capturing a set of patient information data to be added to the report; loading a subset of the series of images that includes the at least one annotated image; and combining the set of patient information data with the subset of the series of images that includes the at least one annotated image into the report.

In at least one embodiment, the method further comprises performing training of the at least one machine learning model by: applying an encoder to at least one training image to generate at least one feature vector for a training OOI in the at least one training image; selecting a class for the training OOI by applying the at least one feature vector to the at least one machine learning model; and reconstructing, using a decoder, a labeled training image by associating the at least one feature vector with the at least one training image and the selected class with which to train the at least one machine learning model.

In at least one embodiment, the class is a healthy tissue class, an unhealthy tissue class, a suspicious tissue class, or an unfocused tissue class.

In at least one embodiment, the method further comprises training the at least one machine learning model using training datasets that include labeled training images, unlabelled training images, or a mix of labelled and unlabelled training images, the images including examples categorized by healthy tissue, unhealthy tissue, suspicious tissue, and unfocused tissue.

In at least one embodiment, the method further comprises training the at least one machine learning model using supervised learning, unsupervised learning, or semi-supervised learning.

In at least one embodiment, the training datasets further include subcategories for each of the unhealthy tissue and the suspicious tissue.

In at least one embodiment, the method further comprises creating the at least one machine learning model by: receiving training images as input to the encoder; projecting the training images, using the encoder, into features that are part of a feature space; mapping the features, using a classifier, to a set of target classes; identifying morphological characteristics of the training images to generate a new training dataset, the new training dataset having data linking parameters to the training images; and determining whether there is one or more mapped classes or no mapped classes based on the morphological characteristics.

In at least one embodiment, the method further comprises, determining the classification for the at least one OOI by: receiving one or more of the features as input to the decoder; mapping the one of the features over an unlabelled data set using a deconvolutional neural network; and reconstructing a new training image from the one of the features using the decoder to train the at least one machine learning model.

In at least one embodiment, the method further comprises training the speech-to-text conversion algorithm using a speech dataset, the speech dataset comprising ground truth text and audio data for the ground truth text, to compare new audio data to the speech dataset to identify a match with the ground truth text.

In at least one embodiment, the speech-to-text conversion algorithm maps the at least one OOI to one of a plurality of OOI medical terms.

In at least one embodiment, the medical image data is obtained from one or more endoscopy procedures, one or more MRI scans, one or more CT scans, one or more X-rays, one or more ultrasonographs, one or more nuclear medicine images, or one or more histology images.

In another broad aspect, in accordance with the teachings herein, there is provided, in at least one embodiment, a method for training at least one machine learning model for use with analyzing medical image data for a medical procedure and a speech-to-text conversion algorithm, wherein the method comprises: applying an encoder to at least one training image to generate at least one feature for a training object of interest (OOI) in the at least one training image; selecting a class for the training OOI by applying the at least one feature to the at least one machine learning model; reconstructing, using a decoder, a labeled training image by associating the at least one feature with the training image and the selected class with which to train the at least one machine learning model; training the speech-to-text conversion algorithm to identify matches between new audio data and ground truth text using a speech dataset comprising the ground truth text and audio data for the ground truth text, thereby generating at least one text string; and overlaying the training OOI and the at least one text string on an annotated image.

In at least one embodiment, the class is a healthy tissue class, an unhealthy tissue class, a suspicious tissue class, or an unfocused tissue class.

In at least one embodiment, the method further comprises training the at least one machine learning model using training datasets that include labeled training images, unlabelled training images, or a mix of labelled and unlabelled training images, the images including examples categorized by healthy tissue, unhealthy tissue, suspicious tissue, and unfocused tissue.

In at least one embodiment, training the at least one machine learning model includes using supervised learning, unsupervised learning, or semi-supervised learning.

In at least one embodiment, the training datasets further include subcategories for each of the unhealthy tissue and the suspicious tissue.

In at least one embodiment, the method further comprises creating the at least one machine learning model by: receiving training images as input to the encoder; projecting the training images, using the encoder, into a feature space that comprises features; mapping the features, using a classifier, to a set of target classes; identifying morphological characteristics of the training images to generate a training dataset, the training dataset having data linking parameters to the training images; and determining whether there is one or more mapped classes or no mapped classes based on the morphological characteristics.

In at least one embodiment, the method further comprises receiving one or more of the features as input to the decoder; mapping the one of the features over an unlabelled data set using a deconvolutional neural network; and reconstructing a new training image from the one of the features using the decoder to train the at least one machine learning model.

In at least one embodiment, the speech-to-text conversion algorithm maps the at least one OOI to one of a plurality of OOI medical terms.

In at least one embodiment, the method further comprises: generating at least one new training image from an object of interest (OOI) detected while analyzing the medical image data when at least one text string associated with the OOI is determined to be a ground truth for that OOI based on the speech-to-text conversion algorithm producing an input audio that matches the at least one text string.

In at least one embodiment, the method further comprises: generating at least one new training image from an object of interest (OOI) detected while analyzing the medical image data when at least one text string associated with the OOI is determined not to be a ground truth for that OOI based on the speech-to-text conversion algorithm producing an input audio that matches the at least one text string.

In at least one embodiment, the training is performed for medical image data obtained from one or more endoscopy procedures, one or more MRI scans, one or more CT scans, one or more X-rays, one or more ultrasonographs, one or more nuclear medicine images, or one or more histology images.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. F 8B shows a detailed block diagram of a second example embodiment of a U-net architecture for use by an object detection algorithm.

Figure 9:
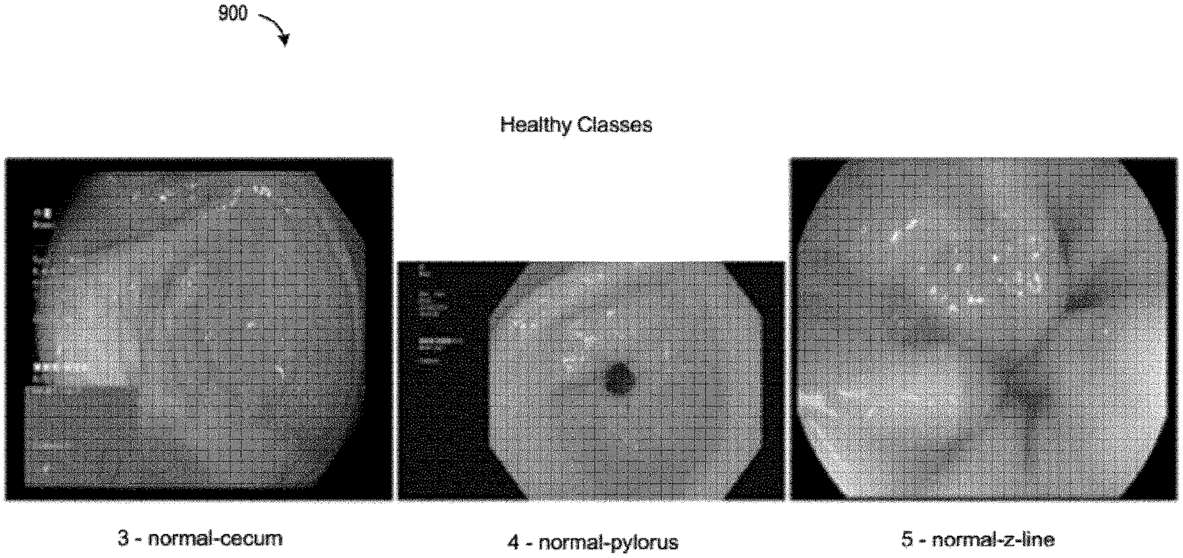

FIG. 9 shows examples of endoscopy images with healthy morphological characteristics.

Figure 10:
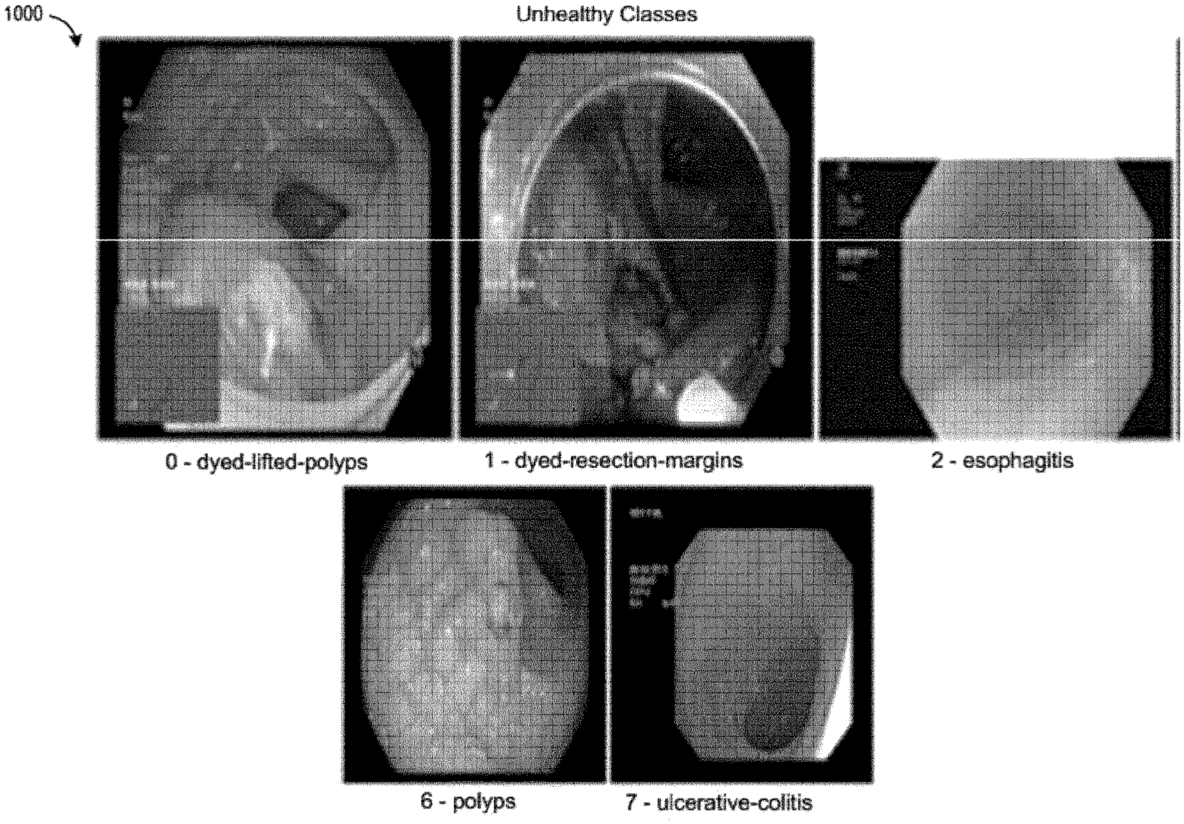

FIG. 10 shows examples of endoscopy images with unhealthy morphological characteristics.

Figure 11:
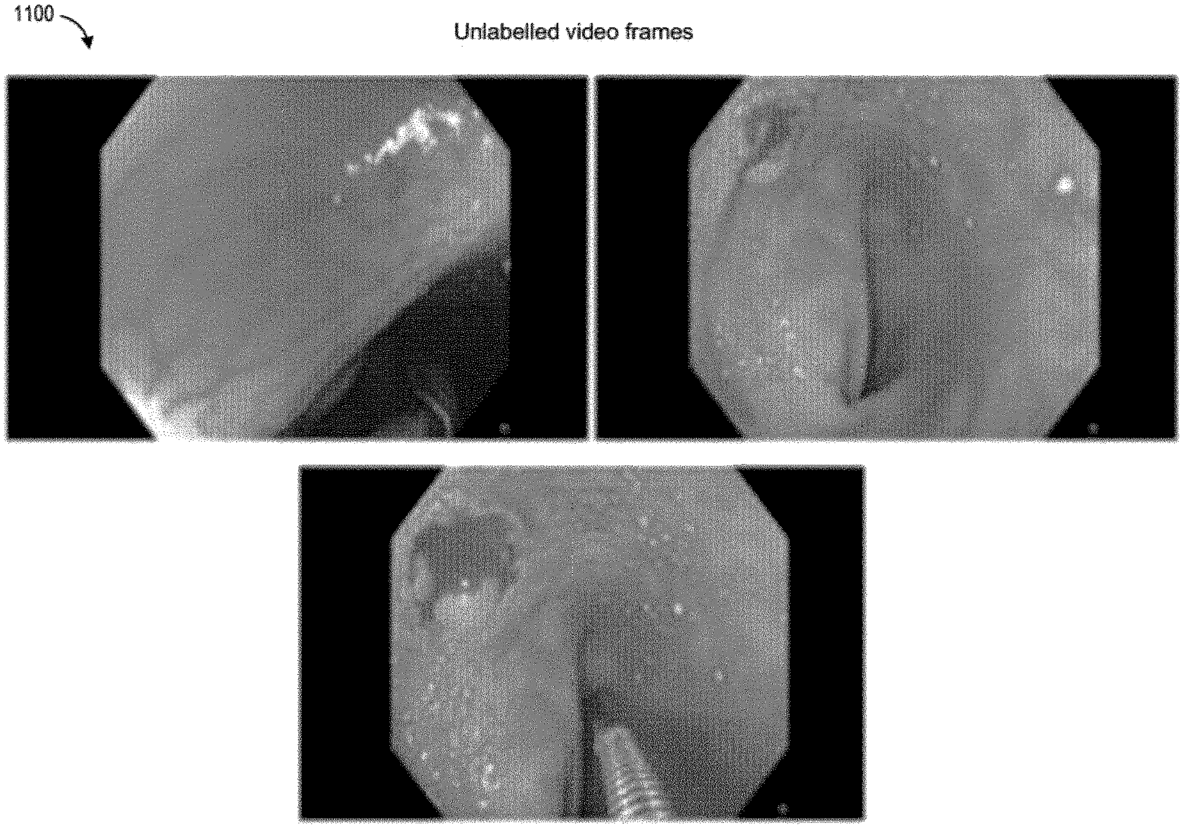

FIG. 11 shows examples of unlabeled video frame images from an exclusive data set.

Figure 12:
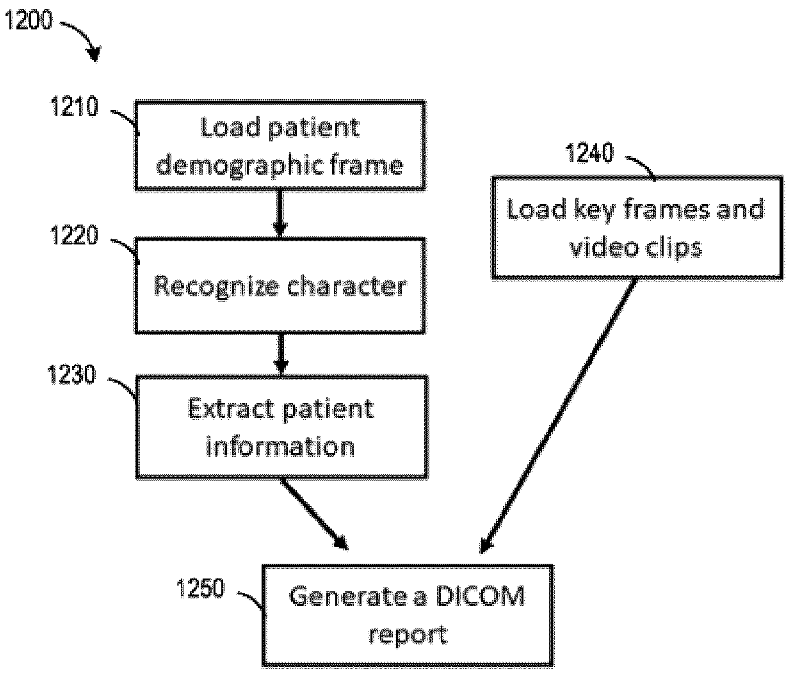

FIG. 12 shows a block diagram of an example embodiment of a report generation process.

Figure 13:
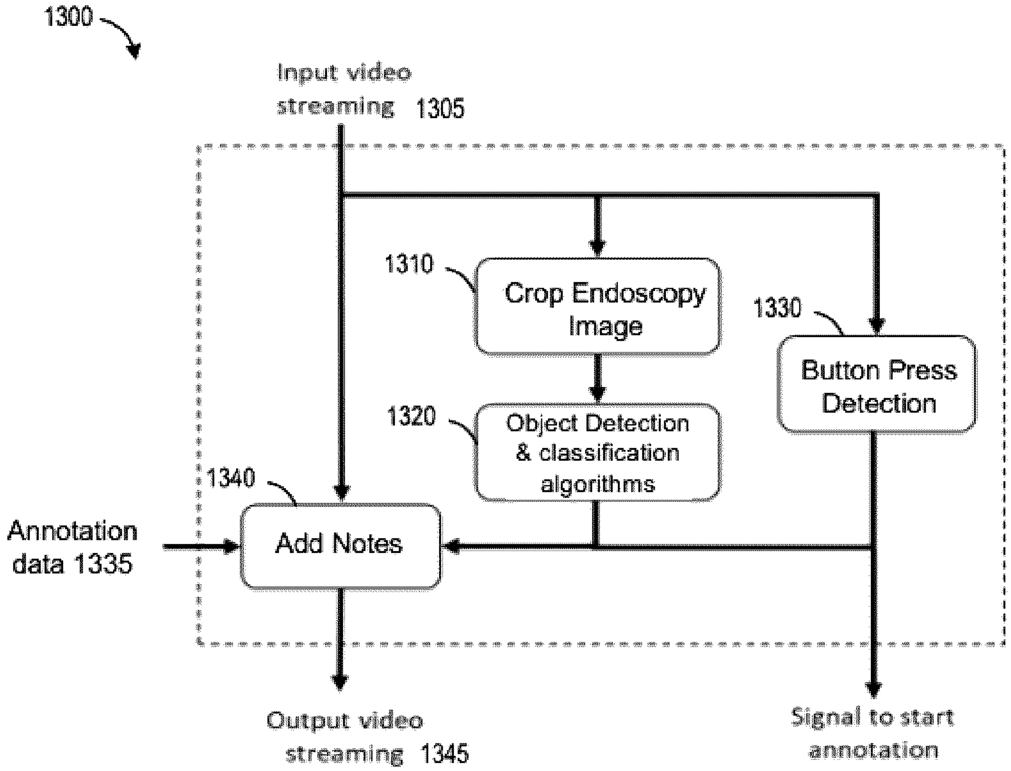

FIG. 13 shows a block diagram of an example embodiment of a method for processing an input video stream using a video processing algorithm and an annotation algorithm.

Figure 14:
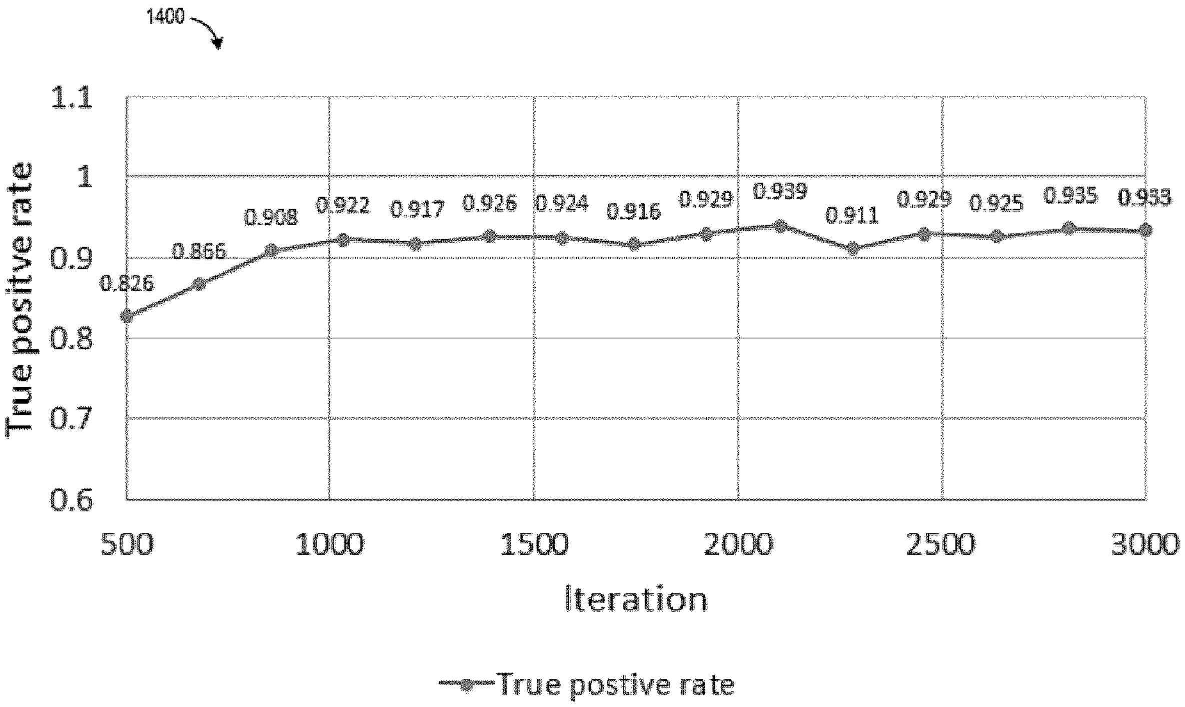

FIG. 14 shows a chart of training results that show the positive speech recognition outcome rates against true positive values.

Figure 15:
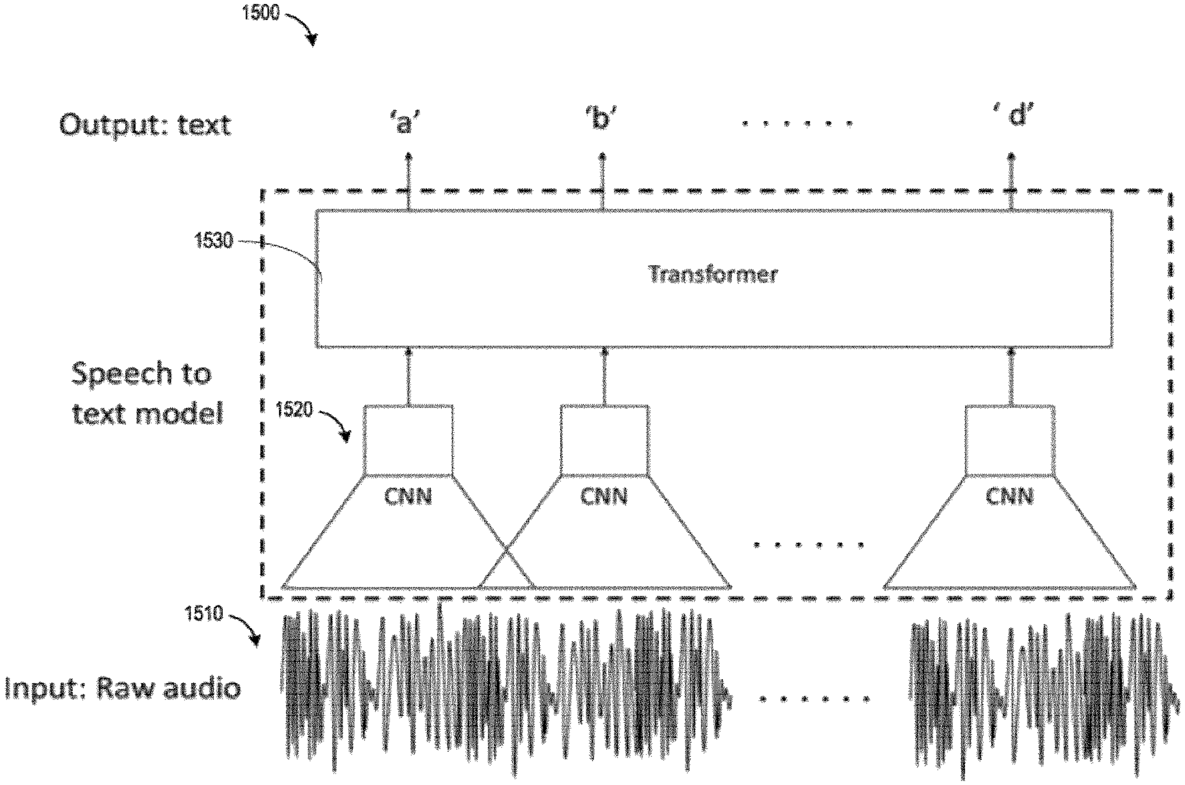

FIG. 15 shows a block diagram of an example embodiment of a speech recognition algorithm.

Figure 16:
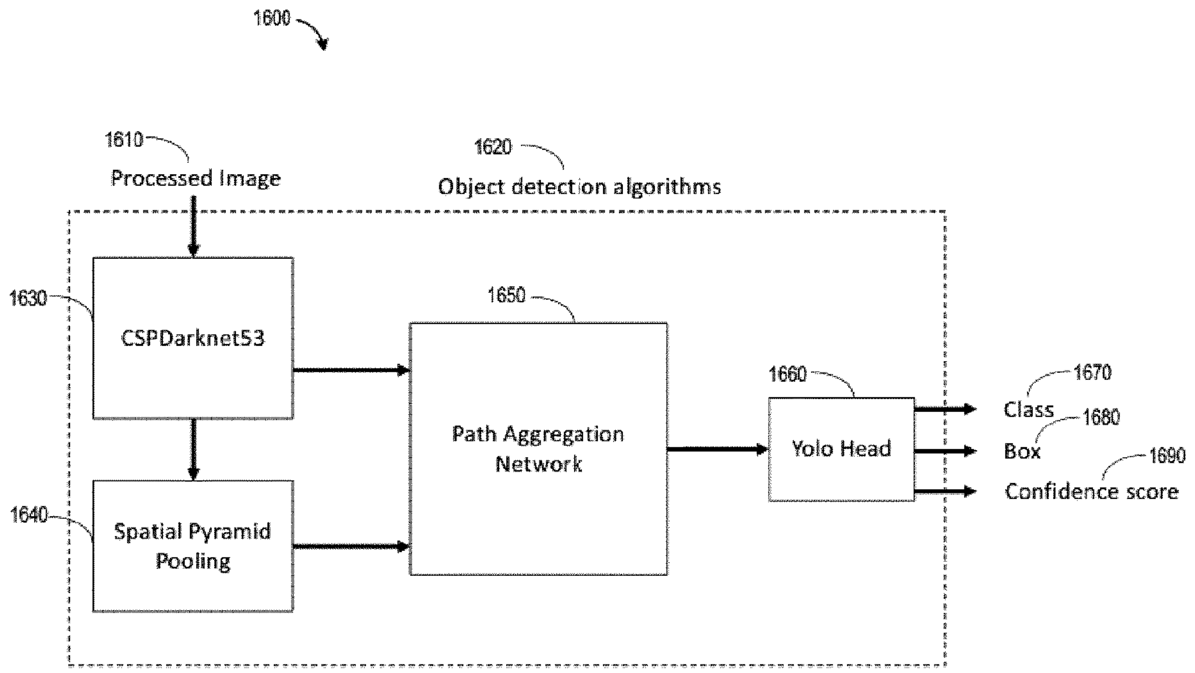

FIG. 16 shows a block diagram of an example embodiment of an object detection algorithm, which may be used by the image analysis algorithm.

Figure 17:
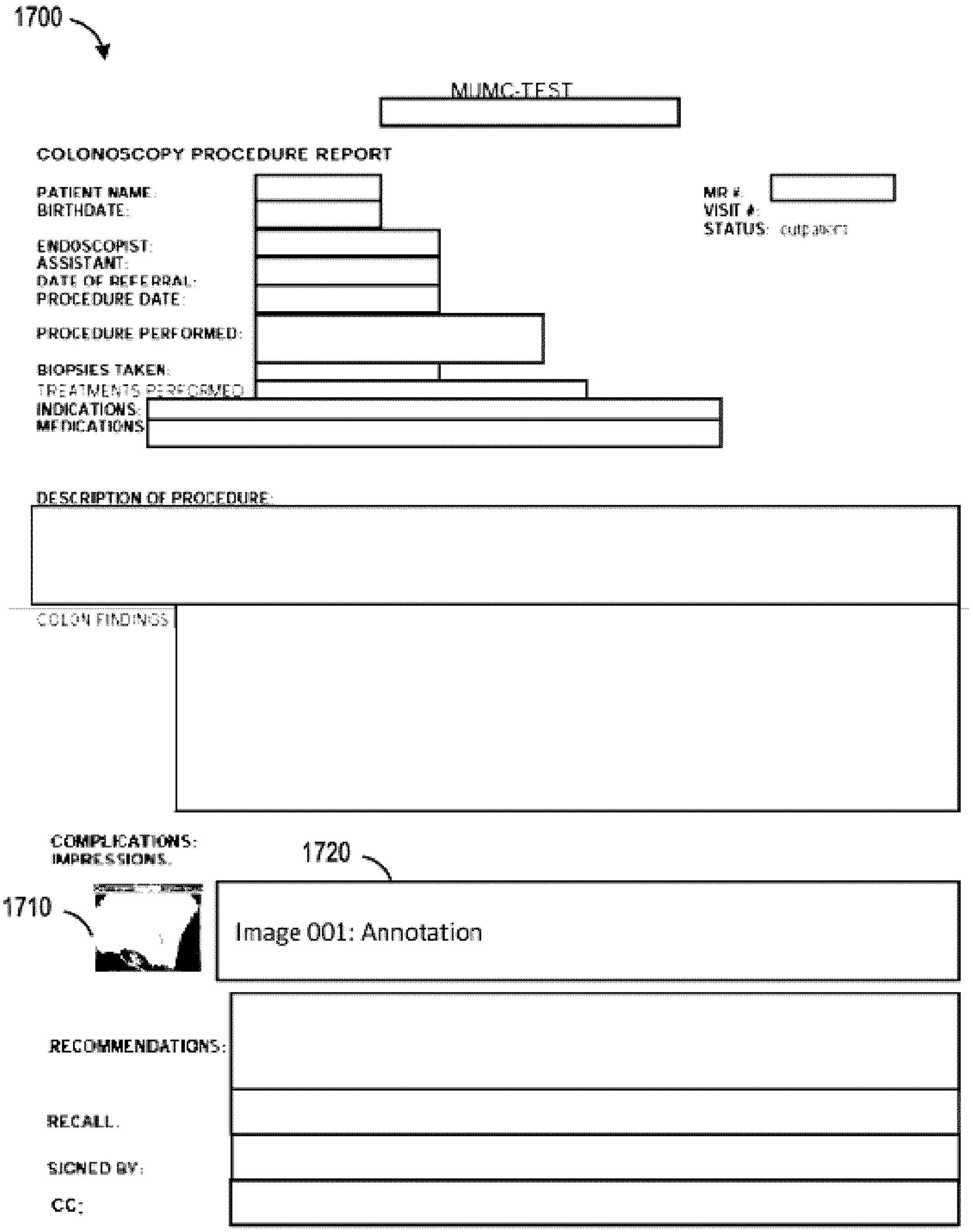

FIG. 17 shows an example embodiment of a report including an annotated image.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems, or methods having all of the features of any one of the devices, systems, or methods described below or to features common to multiple or all of the devices, systems, or methods described herein. It is possible that there may be a device, system, or method described herein that is not an embodiment of any claimed subject matter. Any subject matter that is described herein that is not claimed in this document may be the subject matter of another protective instrument, for example, a continuing patent application, and the applicants, inventors, or owners do not intend to abandon, disclaim, or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical signal, electrical connection, or a mechanical element depending on the particular context.

It should also be noted that, as used herein, the wording "and/or" is intended to represent an inclusive or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5%, or 10%, for example, if this deviation does not negate the meaning of the term it modifies.

Furthermore, the recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

It should also be noted that the use of the term "window" in conjunction with describing the operation of any system or method described herein is meant to be understood as describing a user interface for performing initialization, configuration, or other user operations.

The example embodiments of the devices, systems, or methods described in accordance with the teachings herein may be implemented as a combination of hardware and software. For example, the embodiments described herein may be implemented, at least in part, by using one or more computer programs, executing on one or more programmable devices comprising at least one processing element and at least one storage element (i.e., at least one volatile memory element and at least one non-volatile memory element (memory elements may also be referred to as memory units herein)). The hardware may comprise input devices including at least one of a touch screen, a touch pad, a microphone, a keyboard, a mouse, buttons, keys, sliders, an electroencephalography (EEG) input device, an eye moment tracking device, etc., as well as one or more of a display, a printer, and the like depending on the implementation of the hardware.

It should also be noted that there may be some elements that are used to implement at least part of the embodiments described herein that may be implemented via software that is written in a high-level procedural language such as object-oriented programming. The program code may be written in C++, C #, JavaScript, Python, or any other suitable programming language and may comprise modules or classes, as is known to those skilled in object-oriented programming. Alternatively, or in addition thereto, some of these elements implemented via software may be written in assembly language, machine language, or firmware as needed. In either case, the language may be a compiled or interpreted language.

At least some of these software programs may be stored on a computer-readable medium such as, but not limited to, a ROM, a magnetic disk, an optical disc, a USB key, and the like, or on the cloud, that is readable (or accessible) by a device having a processor, an operating system, and the associated hardware and software that is necessary to implement the functionality of at least one of the embodiments described herein. The software program code, when read by the device, configures the device to operate in a new, specific, and predefined manner (e.g., as a specific-purpose computer) in order to perform at least one of the methods described herein.

At least some of the programs associated with the devices, systems, and methods of the embodiments described herein may be capable of being distributed in a computer program product comprising a computer readable medium that bears computer usable instructions, such as program code, for one or more processing units. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g., downloads), media, digital and analog signals, and the like. The computer useable instructions may also be in various formats, including compiled and non-compiled code.

In accordance with the teachings herein, there are provided various embodiments for a system and method for processing medical images of various modalities, and computer products for use therewith. The processing may be done in real time.

In at least one embodiment of the system, the system provides an improvement to conventional systems of analyzing medical image data for a medical procedure to produce annotated images from a series of images, such as a video feed, for example, taken during the medical procedure. The medical procedure may be a medical diagnostic procedure. For example, the system receives an image, which may be one video frame from a sequence of video frames or may be obtained from a series of images, such as one or more images for one or more corresponding CT or MRI slices, for example. The system determines when there is an object of interest (OOI) in the image and, when there is an OOI, determines a classification for the OOI. The system performs both of these determinations using at least one machine learning model. The system displays the image and any determined OOIs to a user on a display during the medical procedure. The system also receives input audio from the user during the medical procedure. The system recognizes speech from the input audio and converts the speech into a text string using a speech-to-text conversion algorithm. In some cases, the system matches the text string with a corresponding image. The system generates an annotated image in which the text string is linked to (e.g., superimposed on) the corresponding image. In at least one alternative embodiment, the text string may include commands such as for viewing images (which may be referred to as reference images) from a library or database where the reference images have been classified similarly as the OOI and can be displayed to allow a user to compare a given image from a series of images (e.g., from a sequence of video frames or a series of images from CT or MRI slices) with the reference images to determine whether the automated classification of the OOI is correct or not.

Medical Imaging Technologies

The various embodiments for a system and method for processing medical images in real time described herein have applications in various medical imaging technologies. One of the advantages of the embodiments described herein includes providing speech recognition to generate text in real time that may be used to (a) identify/mark an area of interest in an image, where the area of interest may be an abnormality, an area of structural damage, an area of a physiological change, or a treatment target; and/or (b) mark/tag the area of interest in an image for the next step of treatment or procedure(s). Another one of the advantages includes the capability to generate an instant report (e.g., where images may be included in the report based on the identification/marking/tagging as well as the generated text or a portion thereof). Another one of the advantages includes displaying previously annotated or characterized images that are similar to an OOI identified by the operator, in real-time, to enhance and support the operator's diagnostic capabilities.

The various embodiments described herein may also have applications in voice-to-text technologies during procedures, such as the opportunity to provide real-time, time-stamped documentation of procedural occurrences for quality assurance and clinical notes. In endoscopy, for example, this includes documentation of patient symptoms (e.g., pain), analgesic administration, patient position change, etc. These data can then be recorded simultaneously with other monitoring information, patient physiological parameters (e.g., pulse, BP, oximetry), and instrument manipulation, etc.

Table 1 below provides examples, but is not an exhaustive list, of clinical applications for using the various embodiments of the systems and methods for processing medical images described herein:

TABLE 1

| Clinical Applications | | |
|---|---|---|
| Medical diagnostic field | Imaging modality | Applications for different medical diagnostic fields |
| Respirology | X-ray, MRI, CT Scan, PET-MRI, nuclear medicine imaging (gastric emptying radionuclide scans)<br>Bronchoscopy | COPD, pulmonary arterial hypertension (PAH), idiopathic pulmonary fibrosis (IPF), lung cancer, structural pathology<br>Cancer/lymphoma, infections, structural pathology |
| ENT | Ultrasound, CT Scan, MRI, PET-CT<br>Laryngoscopy | Cancer/lymphoma, structural pathology<br>Cancer/lymphoma, infections, structural pathology |
| Obstetrics & gynecology | Ultrasonography, transvaginal sonography, X-ray, CT Scan, MRI, hysterography, hysteroscopy, PET, or other imaging guidance like catheters and needles through blood vessels and organs<br>Colposcopy<br>Laparoscopy | Treatment procedures: angioplasty, biopsies, stenting, thrombolysis, embolization, and radiofrequency ablation<br>Diagnostic procedures: vascular pelvic trauma, uterine fibroid embolization, uterine arterio-venous malformations, uterine myomas, pelvic congestion syndrome, gynecological malignancies, metrorrhagia<br>Cancer/dysplasia, infection, structural pathology<br>Treatment procedures: hysterectomy, salpingo-oophorectomy, biopsy, tissue resections, lysis of adhesions |
| Cardiology | Echocardiography, transthoracic echocardiography, transesophageal echo, three-dimensional echocardiography<br>CT Scan, CT coronary angiography<br>Cardiac magnetic resonance imaging (CMR)<br>Cardiac catheterization | Velocity of blood flow, valvular insufficiency, chamber volumes, valvular abnormalities, and other structural pathology<br>Structural pathology and heart vasculature<br>Structural pathology<br>coronary angiography |
| Urology | CT urogram<br>Cystography<br>Cystoscopy | Kidney stones, bladder stones, complicated infections, tumors or cysts, cancer, structural problems<br>Hematuria, urinary tract infections, functional problems with bladder, urinary reflux, urinary incontinence, trauma to the bladder, a blockage in or narrowing (strictures) of the ureters or urethra, before or after certain spine surgeries<br>Cancer/lymphoma, infections, structural pathology |
| General Surgery | Laparoscopy | Treatment procedures: hysterectomy, salpingo-oophorectomy, biopsy, tissue resections, lysis of adhesions |
| Orthopedics | Arthroscopy | Treatment procedures: cartilage debridement, ligament repair<br>Cancer/lymphoma, infections, structural pathology |

The additional clinical applications in Table 1 reflect the fact that "endoscopic" techniques are used in many other specialties with a need for real-time identification of abnormalities and real-time documentation by operators who are fully occupied by the visuomotor requirements of performing the procedure. Most "endoscopic" procedures are, primarily, diagnostic albeit with an increasing addition of therapeutic interventions.

Surgical laparoscopy, by contrast, is primarily therapeutic, albeit based on the accurate identification of the therapeutic targets. Many operations are prolonged with little opportunity for integrated documentation of procedural occurrences or therapeutic interventions which must, then, be documented after the procedure from memory.

It should be noted that most specialists incorporate histopathological diagnoses into their management plans, but the histopathological diagnosis and reporting, etc. is performed by the histopathologist. One of the advantages of the embodiments described herein is that they provide a mechanism for the histopathologist to identify, localize, and annotate images or OOI, in real time, during a study, generate a subsequent report, and have access to comparable images/OOIs from a databank.

Another one of the advantages of the embodiments described herein is that they provide the option of marking the location of the OOI in the image using voice control/annotation, and this could be applied to radiology and histopathology. The radiologist or pathologist can identify a lesion, as an OOI, while simultaneously annotating the OOI with voice-to-text technology using a standardized vocabulary.

Annotation of images or videos during procedures, potentially with OOI localization using voice-to-text, is a means to document or report an operation (based on a video recording of (for example) a laparoscopic surgical procedure.

Endoscopy Applications

The various embodiments of systems and methods for processing medical images described, in accordance with the teachings herein, are described with images obtained from GI endoscopy for illustrative purposes. Accordingly, it should be understood that the systems and methods described herein may be used with medical images that are produced from different types of endoscopy applications or other medical applications where images are obtained using other imaging modalities, such as the examples given in Table 1. Some of the different applications for endoscopy for which the systems and methods described herein may be used include, but are not limited to, those relating to the respiratory system, ENT, obstetrics & gynecology, cardiology, urology, neurology, and orthopedic and general surgery.

Respiratory System:

Endoscopy applications include flexible bronchoscopy and medical thoracoscopy such as, but not limited to, endobronchial ultrasound and navigational bronchoscopy, for example, based on using standardized endoscopy platforms, with or without narrow band imaging (NBI).

ENT:

Endoscopy applications include surgical procedures to address audiological complications such as, but not limited to, a stapedotomy surgery or other ENT surgical procedures; surgical procedures to address laryngeal diseases affecting epiglottis, tongue, and vocal cords; surgical procedures for the maxillary sinus; nasal polyps or any other clinical or structural evaluation to be integrated into an otolaryngologist decision support system.

Obstetrics & Gynecology:

Endoscopy applications include the structural and pathological evaluations and diagnosis of diseases related to OBGYN such as, but not limited to, minimally invasive surgeries (including robotic surgical techniques), and laparoscopic surgeries, for example.

Cardiology:

Endoscopy applications include the structural and pathological evaluations and diagnosis of diseases related to cardiology such as, but not limited to, minimally invasive surgeries (including robotic surgical techniques), for example.

Urology:

Endoscopy applications include the procedures used for the diagnosis and treatment of renal diseases, renal structural and pathological evaluations, and treatment procedures (including robotic and minimally invasive surgeries) and applications including, but not limited to, treatment of renal stones, cancer, etc. as localized treatments and/or surgeries.

Neurology (CNS/Spine):

Endoscopy applications include, but are not limited to, structural and pathological evaluations of the spine, such as minimally invasive spine surgery, based on the standardized technologies or 3D imaging, for example.

Orthopedic:

Endoscopy applications include, but are not limited to, joint surgeries.

Figure 1:
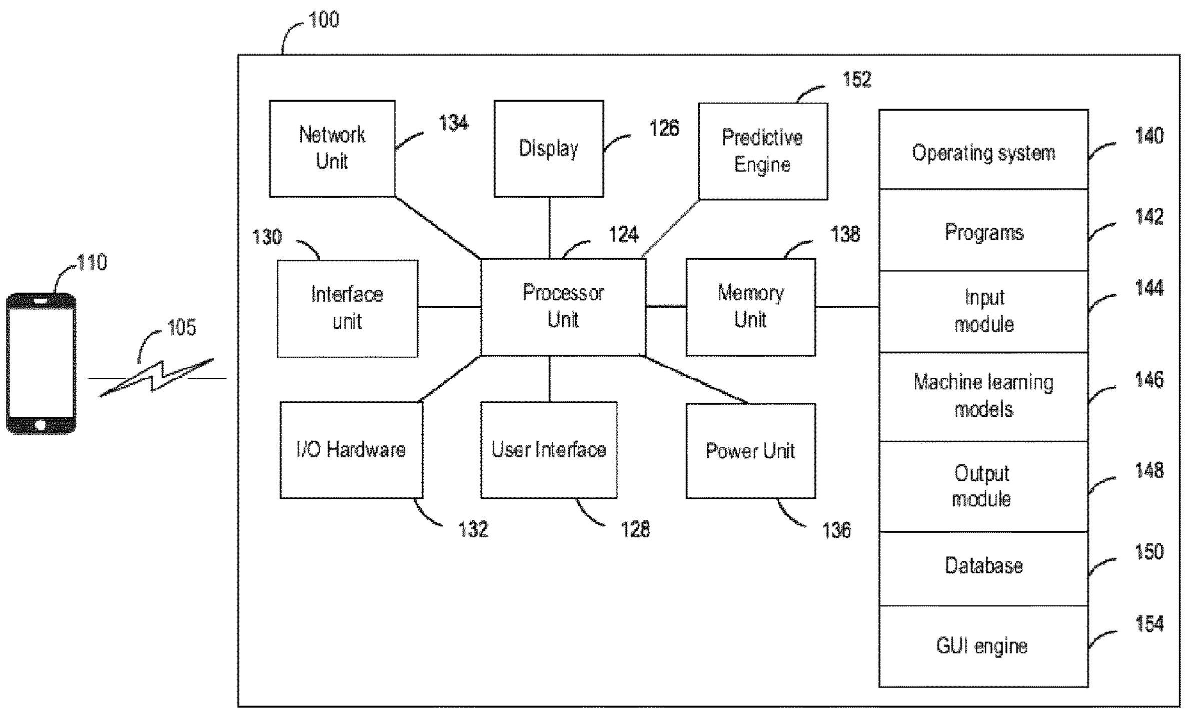
FIG. 1 shows a block diagram of an example embodiment of a system for processing medical procedure images such as, but not limited to, endoscopy images, for example, in real time.

Reference is first made to FIG. 1, showing a block diagram of an example embodiment of an automated system 100 for detecting morphological characteristics in a medical procedure and annotating one or more images in real time. The medical procedure may be a medical diagnostic procedure. When used in the context of endoscopy, the system 100 may be referred to as an endoscopy image analysis (EIA) system. However, as previously mentioned, the system 100 may be used in conjunction with other imaging modalities and/or medical diagnostic procedures. The system 100 may communicate with at least one user device 110. In some embodiments, the system 100 may be implemented by a server. The user device 110 and the system 100 may communicate via a communication network 105, for example, which may be wired or wireless. The communication network 105 may be, for example, the Internet, a wide area network (WAN), a local area network (LAN), WiFi, Bluetooth, etc.

The user device 110 may be a computing device that is operated by a user. The user device 110 may be, for example, a smartphone, a smartwatch, a tablet computer, a laptop, a virtual reality (VR) device, or an augmented reality (AR) device. The user device 110 may also be, for example, a combination of computing devices that operate together, such as a smartphone and a sensor. The user device 110 may also be, for example, a device that is otherwise operated by a user, which may be done remotely; in such a case, the user device 110 may be operated, for example, by a user through a personal computing device (such as a smartphone). The user device 110 may be configured to run an application (e.g., a mobile app) that communicates with certain parts of the system 100.

The system 100 may run on a single computer. The system 100 includes a processor unit 124, a display 126, a user interface 128, an interface unit 130, input/output (I/O) hardware 132, a network unit 134, a power unit 136, and a memory unit (also referred to as "data store") 138. In other embodiments, the system 100 may have more or fewer components but generally function in a similar manner. For example, the system 100 may be implemented using more than one computing device or computing system.

The processor unit 124 may include a standard processor, such as the Intel Xeon processor, for example. Alternatively, there may be a plurality of processors that are used by the processor unit 124, and these processors may function in parallel and perform certain functions. The display 126 may be, but not limited to, a computer monitor or an LCD display such as that for a tablet device. The user interface 128 may be an Application Programming Interface (API) or a web-based application that is accessible via the network unit 134. The network unit 134 may be a standard network adapter such as an Ethernet or 802.11x adapter.

The processor unit 124 may operate with a predictive engine 152, that can be implemented using one or more standalone processors such as a Graphical Processing Unit (GPU), that functions to provide predictions by using machine learning models 146 stored in the memory unit 138. The predictive engine 152 may build one or more predictive algorithms by applying training data to one or more machine learning algorithms. The training data may include, for example, image data, video data, audio data, and text. The prediction may involve first identifying objects in an image and then determining their classification. For example, the training may be based on morphological characteristics of an OOI, such as a polyp or at least one other physiological structure that may be encountered in other medical diagnostics/surgical applications or other imaging modalities, for example, and then during image analysis, image analysis software will first identify if newly obtained images have an OOI that match with the morphological characteristics of an image of a polyp, and if so predict the OOI is a polyp or the at least one other physiological structure. This may be include determining a confidence score that the OOI is correctly identified.

The processor unit 124 can also execute software instructions for a graphical user interface (GUI) engine 154 that is used to generate various GUIs. The GUI engine 154 provides data according to a certain layout for each user interface and also receives data input or control inputs from a user. The GUI engine 154 may then uses the inputs from the user to change the data that is shown on the display 126, or changes the operation of the system 100, which may include showing a different GUI.

The memory unit 138 may store the program instructions for an operating system 140, program code 142 for other applications (also referred to as "the programs 142"), an input module 144, a plurality of machine learning models 146, an output module 148, a database 150, and the GUI engine 154. The machine learning models 146 may include, but are not limited to, image recognition and classification algorithms based on deep learning models and other approaches. The database 150 may be, for example, a local database stored on the memory unit 138, or in other embodiments it may be an external database such as a database on the cloud, multiple databases, or a combination thereof.

In at least one embodiment, the machine learning models 146 include convolutional neural networks (CNNs), recurrent neural networks (RNNs), and/or other suitable implementations of predictive modeling (e.g., multilayer perceptrons). CNNs are designed to recognize images and patterns. CNNs perform convolution operations, which, for example, can be used to classify regions of an image, and see the edges of an object recognized in the image regions. RNNs can be used to recognize sequences, such as text, speech, and temporal evolution, and therefore RNNs can be applied to a sequence of data to predict what will occur next. Accordingly, a CNN may be used to detect what is happening or detect at least one physiological structure on a given image at a given time, while an RNN can be used to provide an informational message (e.g., a classification of an OOI).

The programs 142 comprise program code that, when executed, configures the processor unit 124 to operate in a particular manner to implement various functions and tools for the system 100. The programs 142 comprise program code that may be used for various algorithms including image analysis algorithms, speech recognition algorithms, a text matching algorithm, and a terminology correction algorithm.

Figure 2:
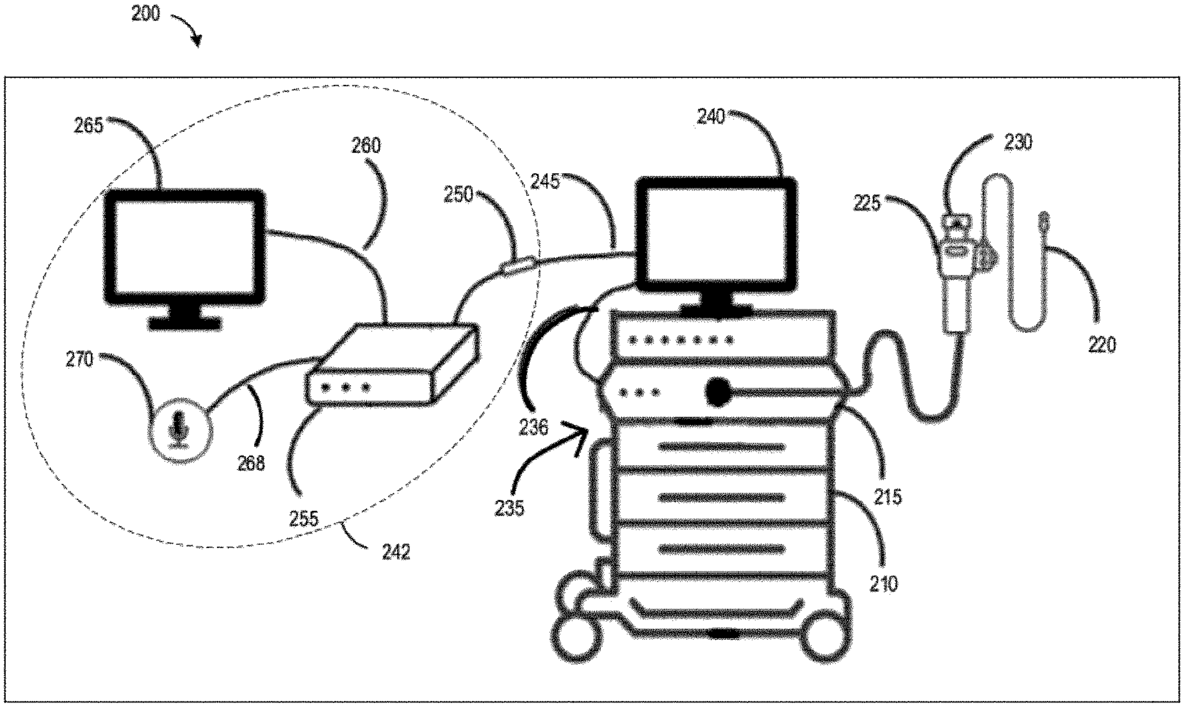
FIG. 2 shows a diagram of an example setup of an endoscopy device and an alternative example embodiment of the endoscopy image analysis system for use with the system of FIG. 1.

Reference is made to FIG. 2, showing a diagram of an example setup 200 of a system for obtaining and processing medical images in real-time. The setup 200 as shown in FIG. 2 shows a system for obtaining and processing endoscopy images, as a specific example of medical images, but may also be used for other medical applications and/or medical imaging modalities. The setup 200 includes an endoscopy system and an endoscopy image analysis (EIA) system 242. The endoscopy system includes five main components: an endoscopy platform 210, a main image processor 215, an endoscope 220, a handheld controller 225, and an endoscopy monitor 240. The endoscopy image analysis system includes elements 245 to 270.

The main image processor 215 receives input through the endoscope 220. The endoscope 220 may be any endoscope that is suitable for insertion into a patient. In other embodiments, for other medical applications and/or imaging modalities, the endoscope is replaced with another imaging device and/or sensors, as described below, for obtaining images, such as the examples given in Table 1. The main image processor 215 also receives input from the user when the endoscope 220 is inserted into a gastrointestinal tract or other human body part and a camera of the endoscope 220 is used to capture images (e.g., image signals). The main image processor 215 receives the image signals from the endoscope 220 that may be processed to be displayed or output. For example, the main image processor 215 sends the images captured by the endoscope 220 to the endoscopy monitor 240 for display thereon. The endoscopy monitor 240 can be any monitor suitable for an endoscopic procedure compatible with the endoscope 220 and with the main image processor 215. For other medical imaging modalities, the main image processor 215 may receive images from other devices/platforms, such as CT scanning equipment, ultrasound devices, MRI scanners, X-ray machines, nuclear medicine imaging machines, histology imaging devices, etc., and accordingly the output from the endoscope 220 is replaced by the output from each of these devices/platforms in those applications, such as the examples given in Table 1.

The image processing unit 235 controls the processing of image signals from the endoscope 220. The image processing unit 235 comprises the main image processor 215, which is used to receive the image signals from the endoscope 220 and then process the image signals in a manner consistent with conventional image processing performed by a camera. The main image processor 215 then controls the display of the processed images on the endoscopy monitor 240 by sending image data and control signals via a connection cable 236 to the endoscopy monitor 240.

The endoscope 220 is connected to a handheld control panel 225 which consists of programmed buttons 230. The handheld control panel 225 and the programmed buttons 230 may be part of the input modules 144. The programmed buttons 230 may be pressed to send input signals to control the endoscope 220. The programmed buttons 230 may be actuated by the user (who may be a clinician, a gastroenterologist, or other medical professional) in order to send an input signal to the main image processor 215 where the input signal may be used to instruct the main image processor 215 to pause a display of a series of images (e.g., a video stream or a sequence of video frames) or take a snapshot of a given image in the series of images (e.g., a video frame of the video stream or a video frame in the sequence of video frames). The input signal may temporarily interrupt the display of the series of images (e.g., the video stream being displayed to the endoscopy monitor 240, which allows the server 120 to detect the particular image (e.g., video frame) that will be annotated.

In at least one embodiment, the endoscope 220 is replaced with an imaging device that produces another kind of image that may or may not together form a video (e.g., slices produced by an MRI device). In such a case, the series of images is the series of those images (e.g., a series of slices).

An EIA system 242 provides an analysis platform, such as an AI-based analysis platform, with one or more components, that is used to analyze the images obtained by the endoscope 220 and provide corresponding annotated versions of these images as well as other functions. The EIA system 242 can be considered as being an alternative example embodiment of the system 100. More generally, the EIA system 242 can be considered as being an alternative example embodiment of the system 100 when used for other medical imaging modalities. In such a case, any reference to endoscopy, endoscopes, or endoscopic images can be replaced by other medical imaging procedures, imaging modalities, imaging devices, or medical images, respectively, such as the examples given in Table 1.

In this example embodiment, the EIA system 242 includes a microcomputer 255 that may be connected to the endoscopy monitor 240, for example, through an HDMI cable 245 to receive the endoscopic images. The HDMI cable 245 can be any standard HDMI cable. A converter key 250 enables the HDMI port of the endoscopy monitor 240 to be connected to the USB port of the microcomputer 255. The microcomputer 255 is communicatively coupled to one or more memory devices, such as memory unit 138, that collectively have stored thereon the programs 142, the predictive engine 152, and the machine learning models 146. The microcomputer 255 executes the image analysis software program instructions to apply the image analysis algorithms to the image signals collected by the endoscope 220.

The microcomputer 255 may be, for example, an NVIDIA Jetson microcomputer which comprises a CPU and a GPU along with one or more memory elements. In addition, the image analysis algorithms include an object detection algorithm, which may be based on YOLOv4, which uses a convolutional neural network (e.g., as shown in FIG. 16) for performing certain functions. The YOLOv4 object detection algorithm may be advantageous as it may allow the EIA system to analyze images at a faster rate. The YOLOv4 object detection algorithm may be implemented, for example, by an NVIDIA Jetson microcomputer with a software accelerator such as TensorRT, Raspberry Pi, or TensorFlow, for example.

The software accelerator TensorRT may be advantageous, as it may allow the EIA system 242 to train the machine learning models 146 at a faster rate using a GPU, such as an NVIDIA GPU. The software accelerator TensorRT may provide further advantages to the EIA system 242 by allowing modification to the machine learning models 146 without affecting performance of the EIA system 242. The software accelerator TensorRT may uses particular functionalities such as layer fusion, block fusion, and float to int convertor to achieve these advantages for the EIA system 242. When the EIA system 242 uses YOLOv4, the software accelerator TensorRT may increase the performance speed of YOLOv4.

The microcomputer 255 may be connected to a microphone 270 through a USB connection 268. The microphone 270 receives acoustic signals which may include user input, such as during a medical procedure (e.g., a medical diagnostic procedure), and transduces the acoustic signals into input audio signals. The microphone 270 can be considered to be part of the I/O hardware 132. One or more processors of the microcomputer 255 may receive the input audio signals obtained by the microphone 270, by operation of the input module software 144. The microcomputer 255 may then apply speech recognition algorithms to the input audio signals collected by the microphone 270. The speech recognition algorithms may be implemented using one or more of the programs 142, the predictive engine 152, and the machine learning models 146.

An image analysis monitor 265 may be connected to the microcomputer 255 through an HDMI connection using a standard HDMI cable 260. The microcomputer 255 displays the results of the image analysis algorithms and speech recognition algorithms on the image analysis monitor 265. For example, for a given image, the image analysis monitor 265 may display one or more OOIs where a bounding box is placed around each OOI and optionally a color indicator may be used for the bounding boxes to signify certain information about elements that are contained within the bounding boxes. The annotations produced by the speech recognition and voice-to-text algorithms may be stored in the database 150 or some other data store. The voice-to-text algorithms may be implemented using one or more of the programs 142, the predictive engine 152, and the machine learning models 146. The microcomputer 255 displays the annotations on the image analysis monitor 265.

It should be noted that in an at least one embodiment described herein, a confidence score may also be generated by the image analysis software. This may be done by comparing each pixel of a determined bounding box for an OOI determined for a given image (i.e., a given video frame) with a ground truth for the object, based on the classification of the object, such as for example, a polyp. The confidence score, may, for example, be defined as a decimal number between 0 and 1, which can be interpreted as a percentage of confidence. The confidence score may then describe the level of agreement between multiple contributors and indicate the "confidence" in the validity of the result. The aggregate result may be chosen based on the response with the greatest confidence. The confidence score may then be compared to a preset confidence threshold which may be tuned over time to improve performance. If the confidence score is larger than the confidence threshold, then the bounding box, classification, and optionally the confidence score may be displayed along with the given image to the user during the medical procedure. Alternatively, if the confidence score is lower than the confidence threshold, the image analysis system may label the given image as being suspicious and display this label along with the given image to the user. In at least one implementation, the confidence score is an output of a network. In such a case, object detection models may output a class of an object, a location of an object, and/or a confidence score. The confidence score may be generated by a neural network by performing convolutional, activation, and pooling operations. An example of how the confidence score is generated may be seen in FIG. 16.

Figure 3:
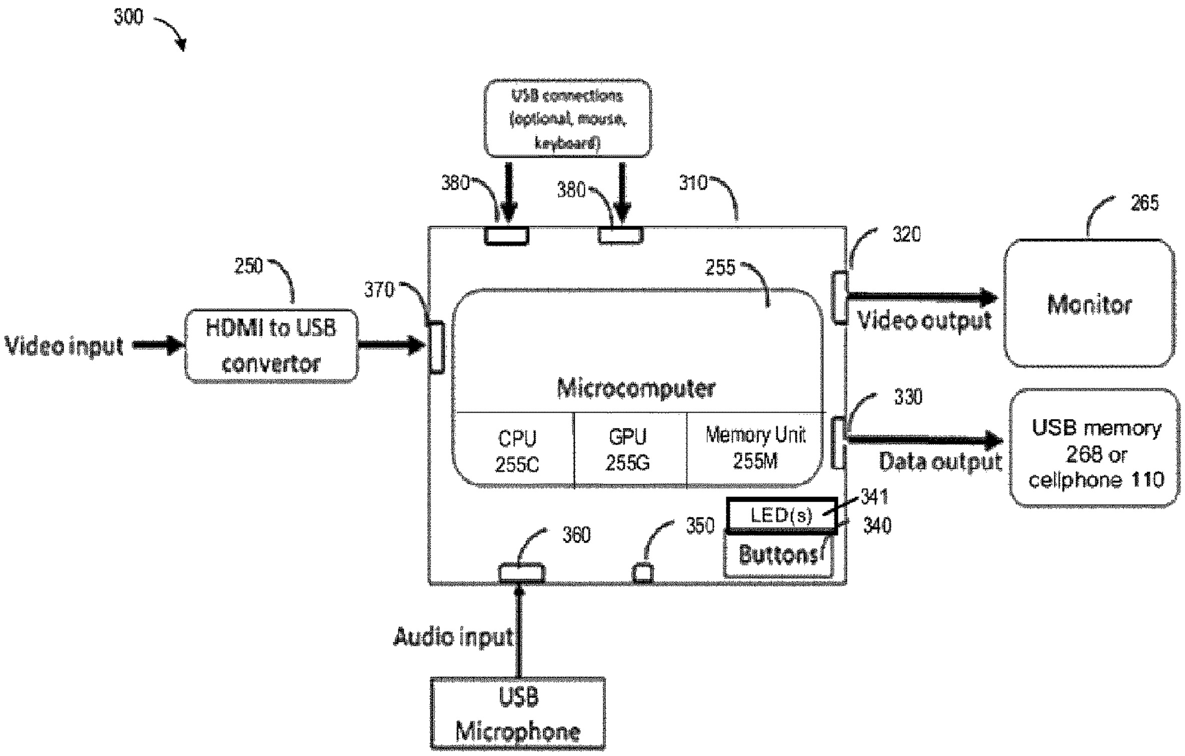
FIG. 3 shows a block diagram of an example embodiment of hardware components and data flow for a computer device for use with the endoscopy image analysis system of FIG. 2.

Reference is made to FIG. 3, showing a block diagram of an example embodiment of hardware components and data flow 300 for a computer device for use with the microcomputer 255 of the EIA system 242. As described herein with reference to FIG. 3, the hardware components and data flow 300 can be used with the EIA system 242 in the context of endoscopy. However, more generally, the EIA system 242 can be considered as being an alternative example embodiment of the system 100 when used for other medical imaging applications and imaging modalities. In such a case, any reference to endoscopy, endoscopes, or endoscopic images that follows can be replaced by other medical imaging procedures, imaging modalities, imaging devices, or medical images, respectively, such as the examples given in Table 1.

The microcomputer 255 is implemented on an electronic board 310 that has various input and output ports. The microcomputer 255 generally comprises a CPU 255C, a GPU 255G and a memory unit 255M. For example, the microcomputer 255 may be hardware that is designed for high-performance AI systems like medical instruments, high-resolution sensors, or automated optical inspection, with GPU 255G of NVIDIA CUDA cores and CPU 255C of NVIDIA Camel ARM, Vision Accelerator, Video Encode, and Video Decode. The data flow 300 consists of input signals being provided to the microcomputer 255 and output signals that are generated by the microcomputer and sent to one or more output devices, storage devices, or remote computing devices. A converter key 250 receives video input signals and directs the video input signals to the microcomputer USB video input port 370. Alternatively, the video input signals may be provided over a USB cable, in which case the converter key 250 is not needed and the microcomputer USB video input port 370 receives the video input signals. The microcomputer USB video input port 370 allows the microcomputer 255 to receive real-time video input signals from the endoscope 220.

The microcomputer 255 receives potential user inputs by directing the input audio signal from the microphone 270 to the microcomputer audio USB port 360. The microcomputer 255 then receives the input audio signal from the microcomputer audio USB port 360 for use by speech recognition algorithms. Additional input devices may be connected to the microcomputer 255 through optional USB connections 380. For example, the microcomputer 255 may be connected to two optional USB connections 380 (e.g., for a mouse and a keyboard).

The microcomputer CPU 255C and GPU 255G operate in combination to run one or more of the programs 142, the machine learning models 146, and the predictive engine 152. The microcomputer 255 may be configured to first store all output files in the memory unit 255M and subsequently store all output files in an external memory. The external memory may be a USB memory card connected to the data output port 330. Alternatively, or in addition, the external memory may be provided by the user device 110. Alternatively, or in addition thereto, the microcomputer 255 may provide output data to another computer (or computing device) for storage. For example, the microcomputer 255 may store the output data on a secure cloud server. As another example, the microcomputer 255 may store and output data on the user device 110, where the user device 110 may be a smartphone with a compatible application.

The microcomputer 255 may have buttons 340 that allow a user to select one or more preprogrammed functions. The buttons 340 may be configured to provide control inputs for specific functionality related to the microcomputer 255. For example, one of the buttons 340 may be configured to turn the microcomputer CPU 255C and/or GPU 255G on, turn the microcomputer CPU 255C and/or GPU 255G off, initiate the operation of a quality control process on the microcomputer 255, run a GUI that shows endoscopy images including annotated images, and to start and end annotation. The buttons 340 may also have LED lights 341 or other similar visual output devices. The microcomputer 255 receives power through a power cable port 350. The power cable port 350 provides the various components of the microcomputer 255 with electricity to allow them to operate.

The microcomputer processor 255C may display the image analysis results on the monitor 265 through a microcomputer USB video output port 320. The monitor 265 may be connected to the microcomputer 255 through the microcomputer HDMI video output port 320 using an HDMI connection.

Figure 4:
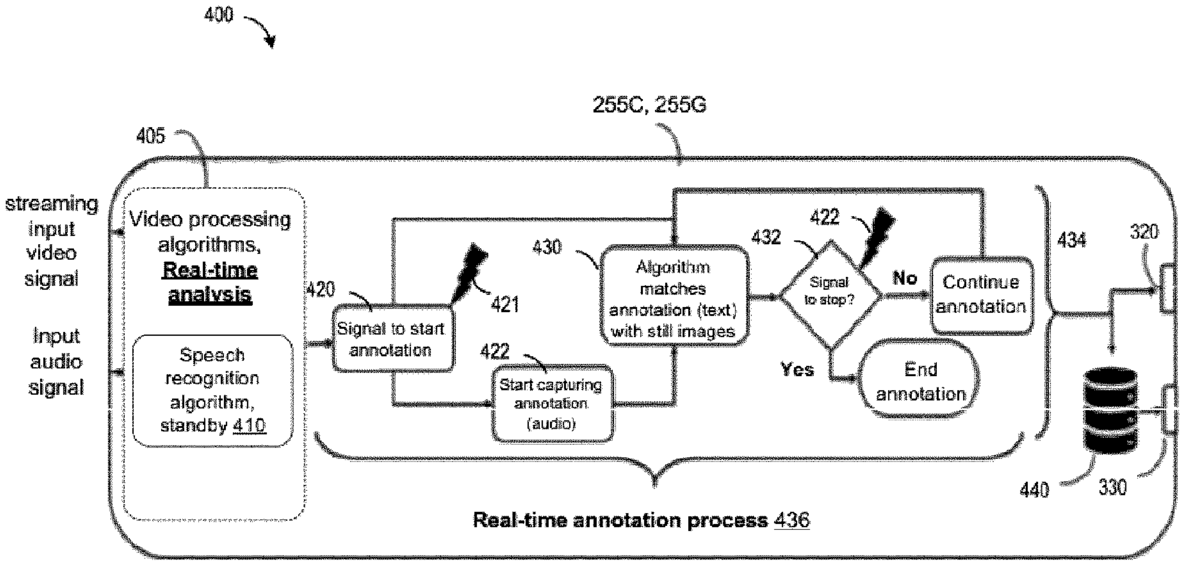
FIG. 4 shows a block diagram of an example embodiment of an interaction between input audio and a real-time annotation process.

Reference is made to FIG. 4, showing a block diagram of an example embodiment of a method 400 for processing input audio and input video signals using a real-time annotation process 436. It should be noted that while the method 400 and subsequent methods and processes are described as being performed by the EIA system 242, this is for illustrative purposes only, and it should be understood that the system 100 may be used or another suitable processing system. However, more generally, the EIA system 242 can be considered as being an alternative example embodiment of the system 100 when used for other medical imaging applications and imaging modalities. In such a case, any reference to endoscopy, endoscopes, or endoscopic images can be replaced by other medical imaging procedures, imaging modalities, imaging devices, or medical images, respectively, such as the examples given in Table 1. The method 400 may be performed by the CPU 255C and the GPU 255G.

The method 400 may provide the annotation process 436 in real time due to the EIA system 242 having a GPU 255G and a CPU 255C with high performance capabilities, and the way that the object detection algorithm is built. Alternatively, or in addition thereto, the method 400 and the object detection algorithm may be executed on the cloud using AWS GPU, where users may upload endoscopy videos and use a process analogous to the real time annotation process 436 (e.g., simulating the endoscopy in real time or allowing for pausing of the video).

At 405, prior to the running the real-time annotation process 436, the EIA system 242 places a speech recognition algorithm 410 on standby. While on standby, the speech recognition algorithm 410 awaits input audio signal from the input module 144. The speech recognition algorithm 410 may be implemented using one or more of the programs 142, the machine learning model 146, and the predictive engine 152.

At 420, the EIA system 242 receives a start signal 421 from a user at a first signal receiver to start the real-time annotation process 436. The EIA system 242 receives the input audio signal through the microphone 270. For example, the signal receiver may be one of the buttons 340.

At 422, the EIA system 242 captures the input audio signal and converts the input audio signal into speech data by using the speech recognition algorithm 410, which may be implemented using the programs 142. The speech data is then processed by a speech-to-text conversion algorithm to convert the speech data into one or more text strings which is used to create annotation data. The EIA system 242 then determines which image the annotation data should be added to by using an image and annotation data matching algorithm.

At 430, the image and annotation data matching algorithm determines a given image from the input images series (e.g., an input video signal) to which the text string in the annotation data corresponds to and then links the annotation data onto the given image. Linking the annotation data onto the given image may include, for example, (a) overlaying the annotation data onto the given image; (b) superimposing the annotation data onto the given image; (c) providing a hyperlink onto the given image that links to web page with the annotation data; (d) providing a pop-up window with the annotation data that pops up when hovering over the given image or a relevant portion thereof; or (e) any equivalent link known to those skilled in the art. The image and annotation data matching algorithms may make this determination, for example, using timestamps that match each other for the capture of the image being annotated and the reception of the annotation data. The input image series can be, for example, an input video signal from the video input stream that was obtained using the endoscope 220. In other imaging modalities, the input video signal may instead be a series of images as previously described.

At 432, a second signal receiver receives and processes an end signal 422. For example, the second signal receiver may be another or the same one of the buttons 340 as the first signal receiver. Upon receiving the end signal 422, the EIA system 242 ends the real-time annotation process 436. When no end signal 422 is received, the EIA system 242 continues the real-time annotation process 436 by continuing to operate the speech recognition algorithm 410, the annotation capture, and the matching algorithm 430.

At 434, the EIA system 242 outputs one or more annotated images. This output may be: (a) displayed on a monitor or display, (b) incorporated into a report, (c) stored on a data storage element/device, and/or (d) transmitted to another electronic device.

The microcomputer 255 is equipped with internal storage 440, such as the memory unit 255M. The internal storage 440 can be used to store data such as a full video of the endoscopic procedure or a portion thereof, one or more annotated images, and/or audio data. For example, the microcomputer 255 may capture the audio data during the real-time annotation process 436 and store it in the internal storage 440. Alternatively, or in addition thereto, the microcomputer 255 may store annotated images in the internal storage 440.

Figure 5A:
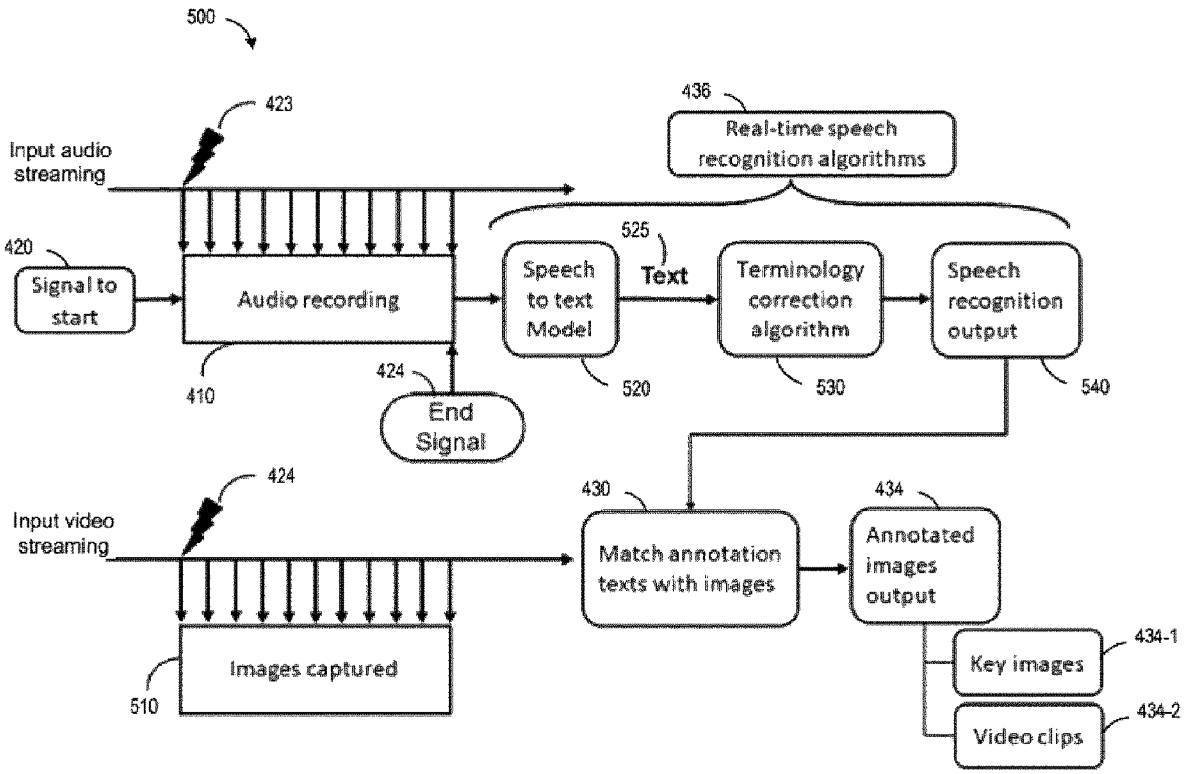
FIG. 5A shows a block diagram of an example embodiment of a method for processing an input audio stream and an input series of images with a real-time annotation process.

Reference is made to FIG. 5A, showing a block diagram of an example embodiment of a method 500 for processing an input audio stream and an input stream of a series of images (e.g., an input video stream) with the real-time annotation process 436. The method 500 may be performed by the CPU 255C and/or the GPU 255G. The method 500 is initiated by a start command signal 423 that is received as input by the EIA system 242. The speech recognition algorithm 410 receives the input audio signal and begins processing to start recognizing speech. The EIA system 242 records audio data determined by the speech recognition algorithm 410. The speech recognition algorithm 410 stops processing the input audio signal when an end command signal 422 is received.

A speech-to-text conversion algorithm 520 may be implemented using one or more of the programs 142, the predictive engine 152, and the machine learning model 146. For example, the speech-to-text algorithm 520 may be an open-source pre-trained algorithm, such as Wav2vec 2.0, or any other suitable speech recognition algorithm. The speech-to-text algorithm 520 takes the speech data determined by the speech recognition algorithm 410 and converts the speech data into text 525 using an algorithm, which may be a convolutional neural network (e.g., as shown in FIG. 15).

The text 525 is then processed by a terminology correction algorithm 530. The terminology correction algorithm 530 may be implemented using one or more of the programs 142 and the predictive engine 152. The terminology correction algorithm 530 corrects errors made by the speech-to-text conversation algorithm 520 using a string-matching algorithm and a custom vocabulary. The terminology correction algorithm 142 may be an open-source algorithm, such as Fuzzywuzzy. The text 525 is cross-referenced against each term in the custom vocabulary. The terminology correction algorithm 142 then calculates a matching score based on how closely the text 525 matches the terms in the custom vocabulary. The terminology correction algorithm determines whether the matching score is higher than a threshold matching score. The terminology correction algorithm 530 replaces the text 525, or a portion thereof, with a term in the custom vocabulary if the matching score is higher than the threshold matching score.

The speech recognition output 540 may be referred to as annotation data which includes an annotation to add to a given image that the user commented on. The speech recognition output 540 is sent to the matching algorithm 430. The matching algorithm 430 may be implemented using the programs 142 or the machine learning models 146. The matching algorithm 430 determines a matching image that the annotation data corresponds to (i.e., which image the user made a verbal comment on, which was converted into the annotation data) and overlays the annotation data from the speech recognition output 540 to the matched image captured from the input stream of a series of images 510 (e.g., the video input stream) from the endoscope 220 to produce an annotated image output 434. The annotated image output 434 may be a key image 434-1 (e.g., which has an OOI) with the speech recognition output 540 overlayed thereon. The annotated image output 434 may be a video clip 434-2 with the speech recognition output 540 overlayed. The key image 434-1 and the video clip 434-2 may be output by the server 120 and stored in 440.

In at least one embodiment, the endoscope 220 is replaced with an imaging device that produces other kinds of images (e.g., slices produced by an MRI device). In such a case, the key image 434-1 may be a different kind of image (e.g., a slice), and the video clip 434-2 may be replaced by a sequence of images (e.g., a sequence of slices).

The speech-to-text conversion algorithm 520 may be trained using a speech dataset comprising ground truth text and audio data for the ground truth text. New audio data may be compared to the new speech dataset to identify a match with the ground truth text. The ground truth text and audio data for the ground truth text can be obtained for various medical applications and imaging modalities, some examples of which are given in Table 1.

Figure 5B:
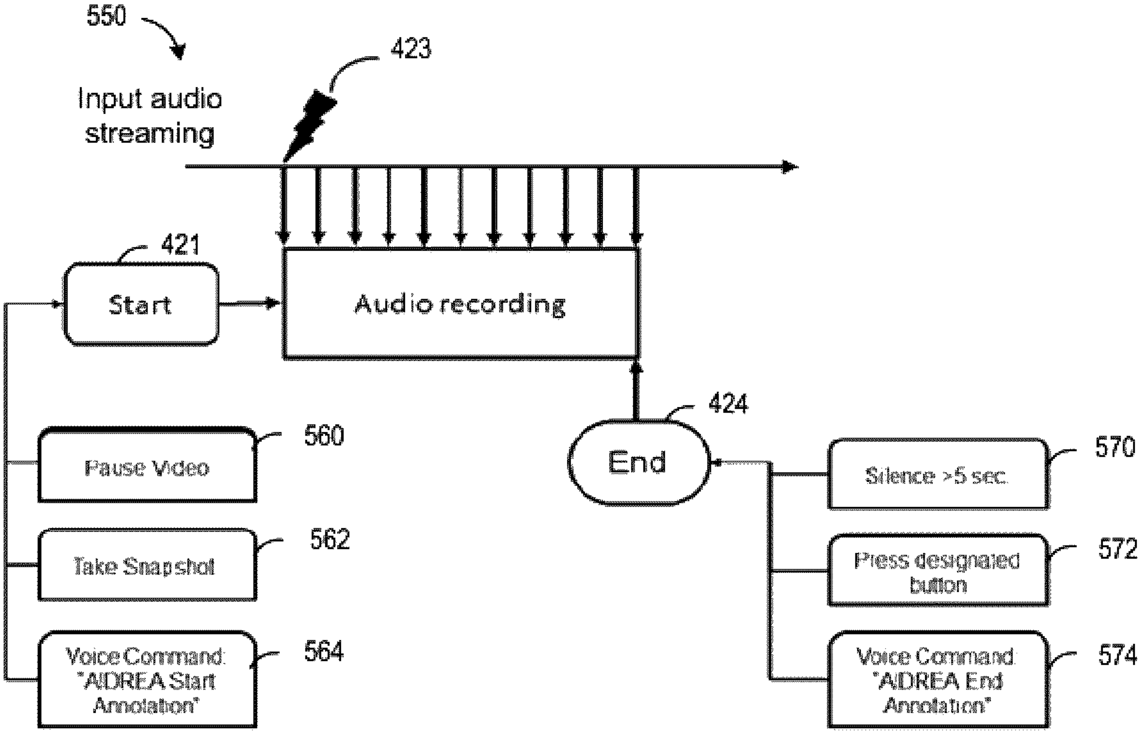
FIG. 5B shows a block diagram of an example embodiment of a method for starting and ending capture of the input audio stream of FIG. 5A.

Reference is made to FIG. 5B, showing a block diagram of an example embodiment of a method 550 for starting and ending capture of an input audio stream that is processed by the speech recognition algorithm 410 of FIG. 5A. The method 550 may be performed by the CPU 255C. The EIA system 242 starts the speech recognition algorithms 410 in response to a start input signal 423 (e.g., provided due to user interaction), which may include a pause video command 560, a take snapshot command 562, or a start voice command 564. When the input signal provides the pause video command 560, the EIA system 242 pauses the input video stream. When the input signal 421 provides the take snapshot command 562, the EIA system 242 takes a snapshot of the input video stream, which involves capturing a particular image that is displayed when the take snapshot command 562 is received. When the input signal 421 provides the start voice command 564, such as "Start Annotation", the EIA system 242 starts annotation. For other medical applications and/or imaging modalities, other control actions may be performed as is known to those skilled in the art.

In at least one embodiment, the EIA system 242 is replaced with an equivalent system for analyzing images obtained from an imaging device that produces other kinds of images (e.g., slices produced by an MRI device). In such a case, the pause video command 560 is replaced by a command that pauses a display of a series of images (e.g., a sequence of slices).

The EIA system 242 ends the operation of the speech recognition algorithm 410 in response to an end input signal 424 (e.g., generated by a user), which may include a silence input 570, a button press input 572, or an end voice command 574. The silence input 570 may be, for example, inaudible input or input audio falling below a threshold volume level. The silence input 570 may be, for example, sustained for at least 5 seconds to successfully end the operation of the speech recognition algorithms 410. The button press input 572 may be the result of a user pressing a designated button, such as one of the buttons 340. The end voice command 574 such as "Stop Annotation" may be used to stop annotating images.

Figure 5C:
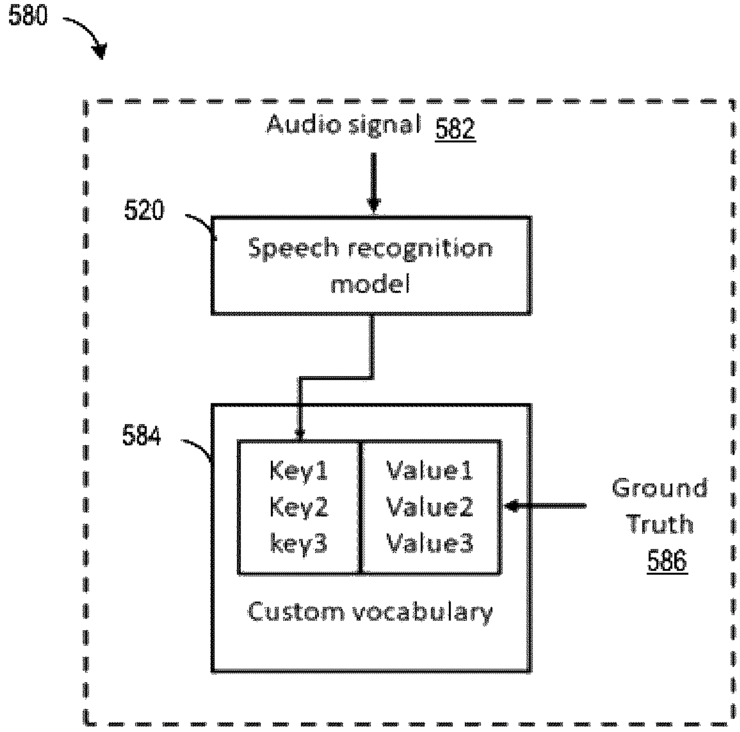
FIG. 5C shows a block diagram of an example embodiment of a method for processing an input audio stream using a speech recognition algorithm.

Reference is made to FIG. 5C, showing a block diagram of a method 580 for processing an input audio stream, such as an audio signal 582, using speech recognition and speech-to-text conversion algorithms, such as a speech-to-text convention algorithm 520, that is cross-referenced with a custom vocabulary 584. The method 580 may be performed by one or more processors of the EIA system 242. The custom vocabulary 584 may be built before the EIA system 242 is operational and optionally updated from time to time. In other embodiments, the custom vocabulary 584 may be built for other medical applications and/or medical imaging modalities. The speech-to-text conversion algorithm 520 receives the audio signal 582 which is typically a user-recorded input into the microphone 270. A ground truth 586 may be a string of terminology specific to the medical procedure that is being performed, such as in gastrointestinal endoscopy, or another type of endoscopic procedure, or other medical procedure using another imaging modality as described previously. The ground truth 586 may be a database file stored in a database (such as the database 150). There may be multiple ground truth datasets for different categories of terminologies, such as stomach, colon, liver, etc. The ground truth 586 may initially consist of predetermined terms specific to gastrointestinal endoscopy, or other medical applications and/or imaging modalities. Accordingly, the ground truth allows the speech-to-text conversion algorithm to map at least one OOI to one of a plurality of OOI medical terms. One OOI may be mapped to more than one medical term since there may be multiple features occurring such as a polyp and bleeding, for example. The ground truth 586 may be advantageous as it allows for updates and accuracy analysis of the speech recognition algorithm 520. The EIA system 242 may receive user input from a keyboard and/or a microphone that updates the ground truth 586. Users can, for example, provide terms by typing them in and/or speak into the microphone 270 in order to update the ground truth 586. A custom vocabulary 584 is a dictionary which consists of key-value pairs. The "key" is the output string 525 of the speech recognition algorithm 520; and the "value" is the corresponding text from the ground truth 586.

Figure 6:
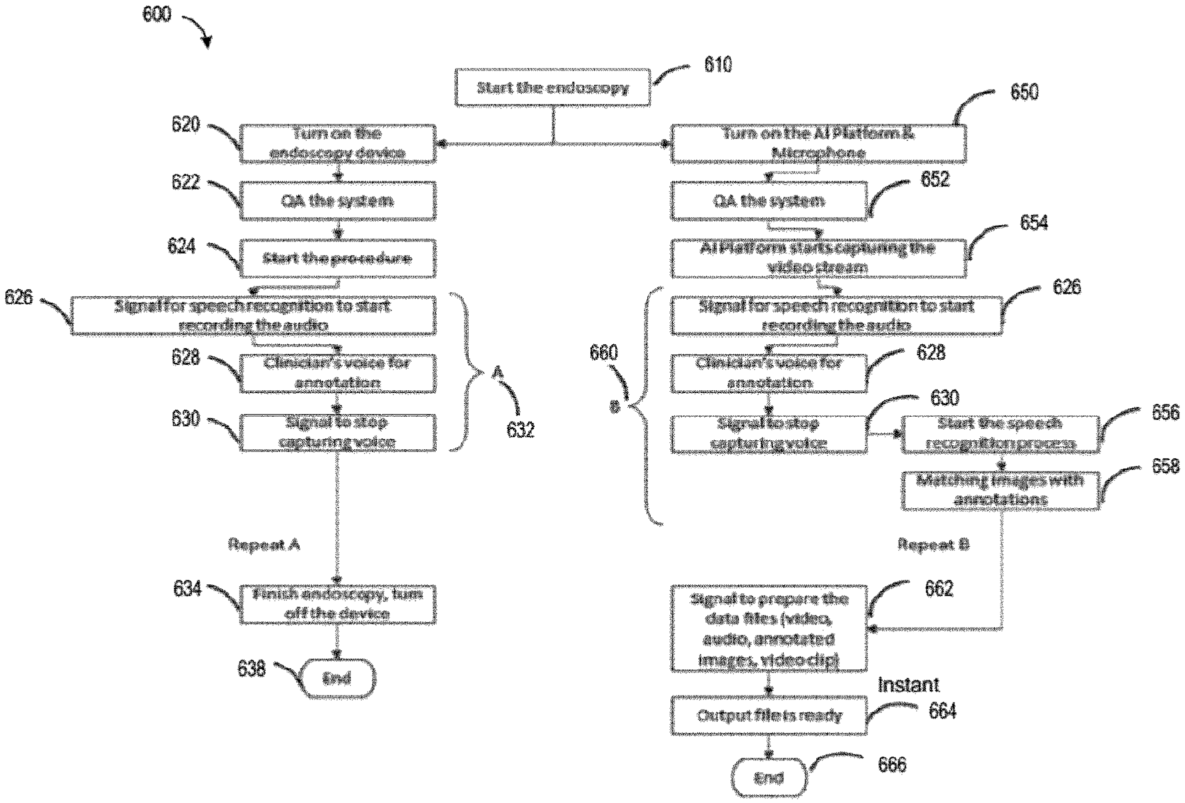
FIG. 6 shows a block diagram of an example embodiment of a method for performing image analysis during an endoscopy procedure using the system of FIG. 2.

Reference is made to FIG. 6, showing a block diagram of an example embodiment of a method 600 for performing image analysis during an endoscopy procedure using the system of FIG. 2. The method 600 can be implemented by the CPU 255C and GPU 255G of the EIA system 242 and allows the EIA system 242 to continuously adapt to the user to generate effective image analysis output for each OOI. Certain steps of the method 600 may be performed using the CPU 255C and the GPU 255G of the microcomputer 255 and the main image processor 215 of the endoscopy platform 210.

At 610, the method 600 begins with the start of an endoscopy procedure. The start of the endoscopy procedure may begin when the endoscopy device is turned on (or activated) at 620. In parallel with this the microphone 270, and the AI platform (e.g., EIA system 242) is turned on at 650. The method 600 includes two branches that are performed in parallel with one another.

Following the branch of the method 600 that begins at 620, the processor 215 of the endoscopy platform 210 receives a signal that there is an operational endoscopy device 220.

At 622, the processor 215 performs a diagnostic check to determine that the operational endoscopy device 220 is properly connected to the processor 210. Step 622 may be referred to as the endoscopy Quality Assurance (QA) step. The processor 215 sends a confirmation to the monitor 240 to indicate to the user that the QA step is successful or unsuccessful. If the processor 215 sends an error message to the monitor 240, the user must resolve the error before continuing the procedure.

Referring to the other branch of method 600 that begins with step 650, after step 650 is performed, the method 600 moves to step 652 where the EIA system 242 performs a diagnostic check to determine that the microcomputer 255 and the microphone 270 are properly connected, which may be referred to as the AI platform Quality Assurance (QA) step. The AI platform QA step includes checking the algorithms. If there is an error, the EIA system 252 produces an error message that is displayed on the monitor 265 to notify the user that the user is required to solve one or more issues related to the error message before continuing to perform video stream capture.

Once the QA step is successfully performed, the method 600 moves to step 654, and the EIA system 242 captures an input video stream that includes images provided by the endoscopy device 220. The image data from the input video stream may be received by the input module 142 for processing by the image analysis algorithms. When the input video stream is being received, or input series of images for other medical imaging modality applications, the microcomputer 255 may activate the LED lights 341 to indicate that EIA system 242 is operating (for example, by showing a stable green light).

Referring back to the left branch again, at 624, the start of the endoscopy procedure, the processor 215 checks the patient information by asking the user to enter the patient information (e.g., via the input module 144) or by directly downloading the patient information from a medical chart. The patient information may consist of patient demographics, the user (e.g., of the EIA system 242), the procedure type, and any unique identifiers. The microcomputer 255 inputs a specific frame/image from the start of the endoscopy procedure. The specific image may be used by the EIA system 242 to produce a second output. The second output may be used in a DICOM report that includes the specific image from the start of the endoscopy procedure and this image may be used to capture the patient information for the DICOM report. Alternatively, or in addition, medical diagnostic (e.g., endoscopic diagnostic) information data may be captured. To ensure privacy, the server 120 may ensure that the patient information is not saved on any other data file.

At 626, after both the start of the endoscopy procedure and the capture of the video stream by the EIA system 242, the EIA system 242 is then on standby to receive an input signal in order to start recording audio. This denotes the beginning of process A 632 and of process B 660. The EIA system 242 begins process A 632 and process B 660 upon receiving the start input signal 421.

At 628, the EIA system 242 receives user input as speech in the input audio signal. The EIA system 242 continues recording the input audio signal until receiving the end input signal 424.

At 630, after receiving the end input signal 424, the EIA system 242 ends the recording of the input audio signal. This denotes the end of process A 632. However, the EIA system 242 may later repeat process A 632 repeatedly when start and stop audio commands are provided until the endoscopic procedure is finished and the endoscopy device 220 is turned off.

Once the endoscopic procedure is finished, the method 600 proceeds to 634, where the processor 215 receives a signal that the endoscopic procedure is finished.

At 638, the processor 215 turns off the endoscopy platform 210. Alternatively, or additionally thereto, the EIA system 242 receives a signal indicating that the endoscopy platform 210 is turned off.

Referring again to the right branch of the method 600, Process B 660 is performed in parallel with Process A 632 and includes all the steps of Process A 632, in performing the speech recognition and speech-to-text algorithms to generate annotation data at 656 and matching images with the annotation data at 658. The EIA system 242 may repeat Process B 660 repeatedly until an input signal including a user command to turn off the endoscopy device is received by the EIA system 242.

At 656, the EIA system 242 initiates the speech recognition and speech-to-text conversion processes and generates the annotation data. This may be done using the speech recognition algorithm 410, the speech-to-text conversion algorithm 520, the terminology correction algorithm 530, and the real-time annotation process 436.

At 658, the EIA system 242 matches images with annotations. This may be done using the matching algorithm 430.

At 662, the real-time annotation process 436 receives a command signal from the user to prepare the data files for the generation of output and for storage. For example, image data, audio signal data, annotated images, and/or a series of images (e.g., video clips) may be marked for storage. An output file may be generated using the annotated images in a certain data format, such as the DICOM format for example.

At 664, the EIA system 242 sends a message that the output file is ready, which may occur after a set time (e.g., 20 seconds or less) after the EIA system 242 receives the prepare data files command signal from the user. At this point, the output files may be displayed on a monitor, stored in a storage element, and/or transmitted to a remote device. The report may also be printed out.

At 666, the EIA system 242 turns off the operational AI platform and microphone at the procedure's end. Alternatively, the EIA system 242 receives a signal indicating that the AI platform and the microphone are turned off. The EIA system 242 can be powered down by a user by entering a software command to initiate a system shutdown and disable power from the power unit 136.

Figure 7:
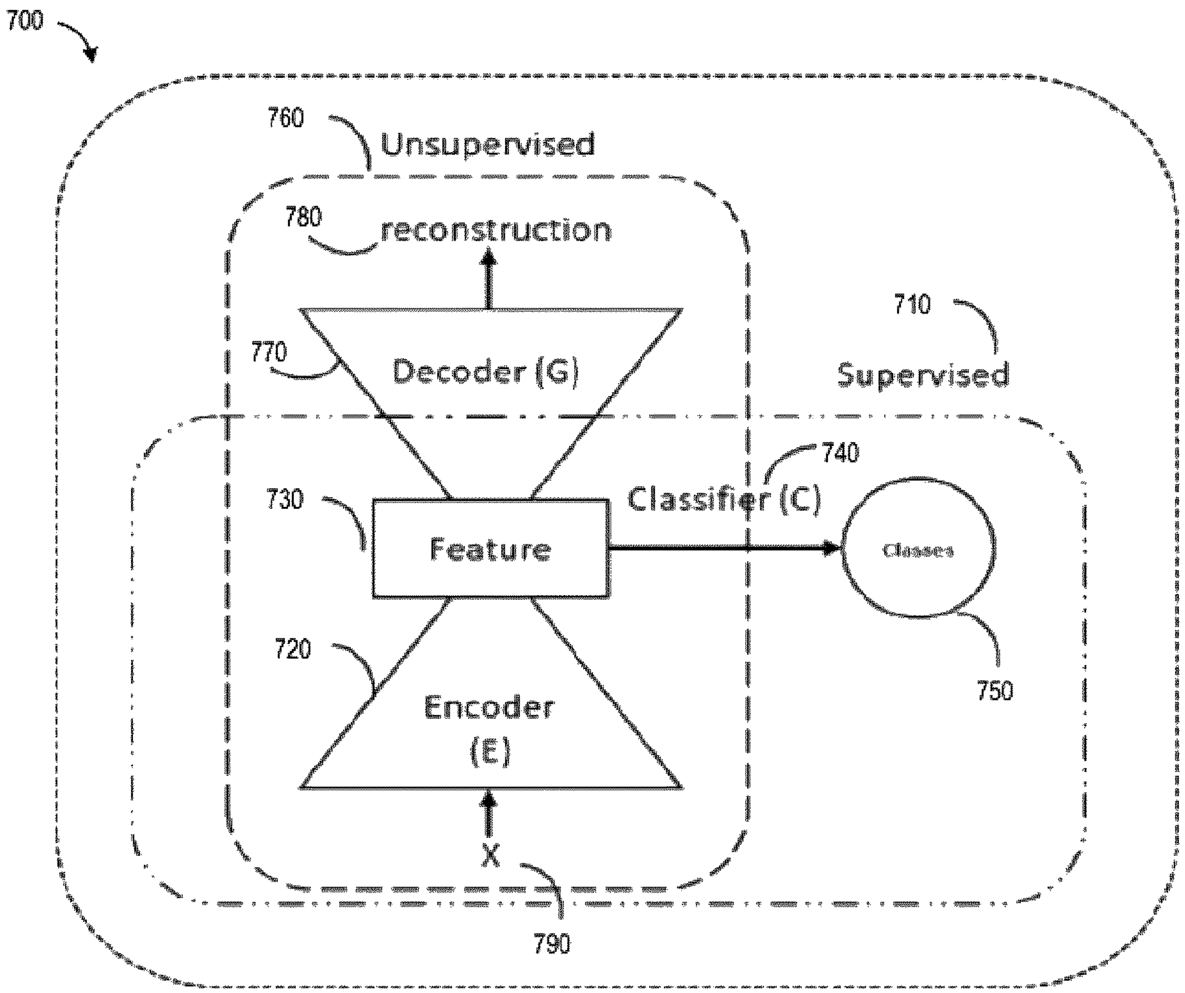
FIG. 7 shows a block diagram of an example embodiment of an image analysis training algorithm.

Reference is made to FIG. 7 showing a diagram of an example embodiment of the image analysis training algorithm 700. An encoder 720 receives an input X 790 (e.g., via the input module 144). The input X 790 is at least one image from a series of images provided by a medical imaging device (e.g., the endoscope 220). The encoder 720 compresses the input X 790 into a feature vector 730 using at least one convolutional neural network (CNN). The feature vector 730 may be an n-dimensional vector or matrix of numerical features that describe the input X 790 for the purposes of pattern recognition. The encoder 720 may perform the compression by allowing only the maximum values in 2×2 patches (i.e., max pool) to propagate towards the feature layer of the CNN in multiple places.

The feature vector 730 is then input to the decoder 770. The decoder 770 reconstructs, from a low-resolution feature vector 730, a high-resolution image 780.

The classifier 740 maps the feature vector 730 into a distribution over the target classes 750. For input images which are labelled (i.e., are annotated with a category or classification), the classifier 740 can be trained together with the encoder 720 and the decoder 770. This may be advantageous as it encourages the encoder 720 and decoder 770 to learn features which are useful for classification, while jointly learning how to classify those features.

The classifier 740 may be constructed from 2 convolutional layers that reduce the channel dimension by half, and then into 1, followed by a fully connected (FC) linear layer to project the hidden state into a real-valued vector with size equal to the number of categories. The result is mapped using a mapping function, such as softmax for example, and represents a categorical distribution over the target classes. A swish activation function (e.g., x*sigmoid (x)) may be used between the convolutional layers. The output of the classifier 740 provides the probability that the model assigns to each category given OOIs in an input image.

The encoder 720, the decoder 770, and the classifier 740, enable the EIA system 242 to perform semi-supervised training. Semi-supervised training is advantageous as it allows the EIA system 242 to build the image analysis algorithms with fewer labeled training datasets.

Given an image Xj, the loss of autoencoder (LAE) is defined for a maximum likelihood (ML) learning of the parameters according to:

$$LAE(xj)=(p(x=xj)\log p(x=xj|h=E\theta(x))+(1-p(x=xj))\log(1-p(x=xj|h=E\theta(x)))),$$

where p (x=xj) is for the input image and p (x=xj|h=Eθ(x)) is for the reconstructed image (i.e., the probability that the reconstructed image from the decoder is the same as the input image), both interpreted as a Bernoulli distribution over a channel-wise and pixel-wise representation of a color image. The Bernoulli distribution provides a measure of consistency between input images and reconstructed images. Each image pixel comprises 3 channels (red, green, and blue). Each channel holds a real-valued number in the range of [0, . . . , 1], which represents the intensity of the corresponding color, where 0 represents no intensity and 1 represents maximum intensity. Since the range is [0, . . . , 1], the intensity values can be used as probabilities in LAE (xj), which is the binary cross-entropy (BCE) between the model and sample data distributions. Minimizing LAE using stochastic gradient descent entails the learning procedure. LAE minimization encourages learning a feature vector which captures the information inside the image. It does so by using the encoded feature vector alone in order to reconstruct the input image. In other words, LAE minimization encourages the learning of informative features, which can then be used for classifications, in cases where labels are available. LAE may be trained in an unsupervised manner, which means that the EIA system 242 does not required a labeled training dataset in order to be built.

Given a labelled image (xi, yi), the EIA system 242 defines the classifier loss (LCLF) for a maximum likelihood (ML) learning of the parameters according to:

$$LCLF(xi, yi) = \log p(y = yi \mid h = E\theta(x)),$$

where p(y=yi|h=Eθ(x)) is the probability of category yi, and LCLF (xi, yi) is the discrete cross-entropy (CE) between the model and sample categorical distributions. LCLF encourages the learned features to be useful for classification and provides per-category probabilities given an input image to be used in the analysis pipeline. LCLF is trained in a supervised manner, which means that the server 120 requires a labeled training dataset in order to be built. The LCLF may be considered to be a loss that quantifies the consistency between the prediction from the model and the ground truth label provided with the training data. Where the LCLF is a standard cross-entropy loss, this amounts to using the log softmax probability that the model gives to the correct class.

The semi-supervised loss over the dataset D is defined as follows:

$$LCLF(D) = \lambda 1 N\left(\sum iLCLF(xi, yi)\right) + 1M\left(\sum jLAE(xj)\right),$$

where λ controls the weight of the classification component, N is the number of labelled images, M is the number of unlabelled images, and typically N<<M (M is significantly bigger than N). The semi-supervised loss allows the learning of informative features from large number of unlabeled images, and the learning of a powerful classifier (e.g., more accurate, and is trainable more quickly) from a smaller amount of labelled images. The weight can force the learning of features which are better suited for classification, on the expense of worse reconstruction. A suitable value for λ includes, for example, 10,000. The weight may provide a way to form a single loss as a linear combination of the autoencoder loss and the classifier loss, which may be determined using some form of cross-validation.

The series of medical images (e.g., an endoscopy video stream) may be analyzed for object detection to determine OOIs in the images using different algorithms. Multiple open-source datasets and/or exclusive medical diagnostic procedure datasets may be used to train the algorithms. For example, in the case of colonoscopy, the dataset includes images classified with OOIs in the healthy, unhealthy, different classes, and unlabeled colonoscopy images, examples of all of which are shown in FIGS. 9, 10, and 11. The algorithms (e.g., the image analysis algorithm, the object detection algorithm) may look at the morphological characteristics of the tissue to classify the tissue and, if unable to clearly identify the tissue, assign it to the "unfocused tissue" (or blurry) class. Accordingly, images in the unfocused tissue class are images that are inadequate and/or of poor quality such that object detection and/or classification cannot be performed accurately. For other medical applications and/or imaging modalities, other classes may be used based on objects of interest that are to be located and classified.

Figure 8A:
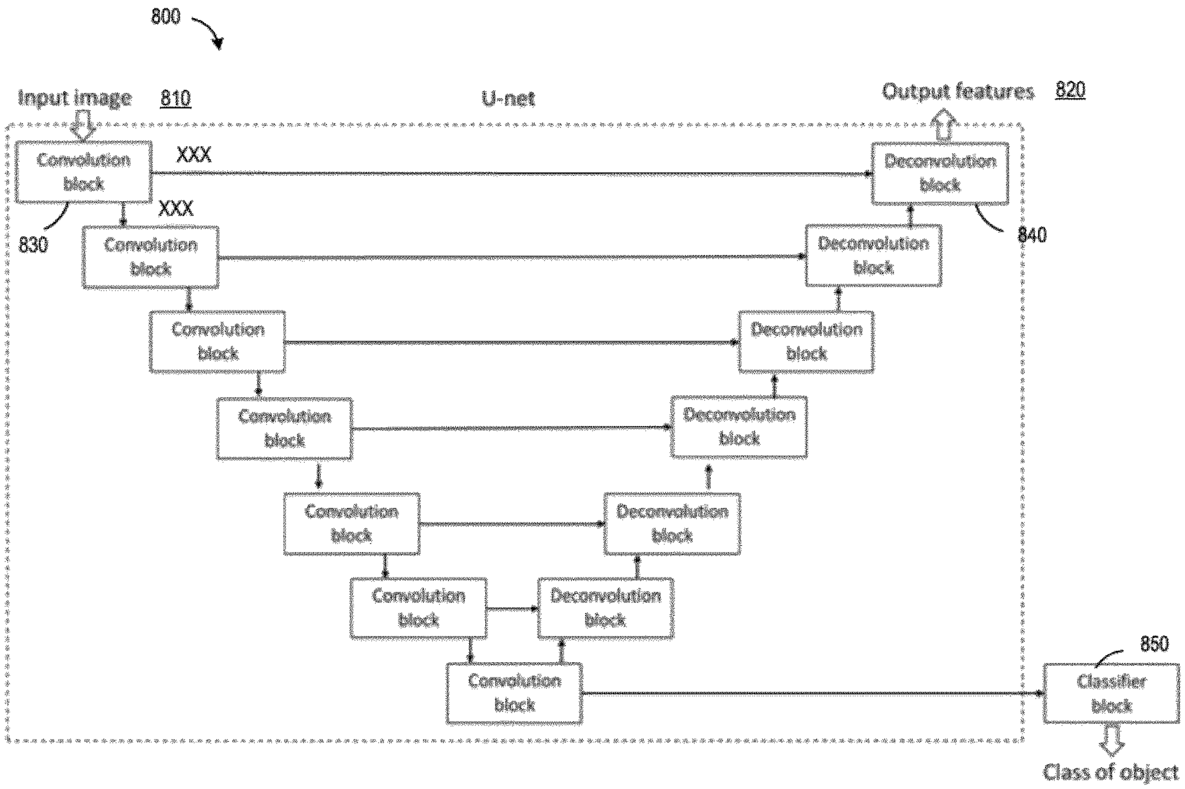
FIG. 8A shows a block diagram of a first example embodiment of a U-net architecture for use by an object detection algorithm.
Figure 8B:
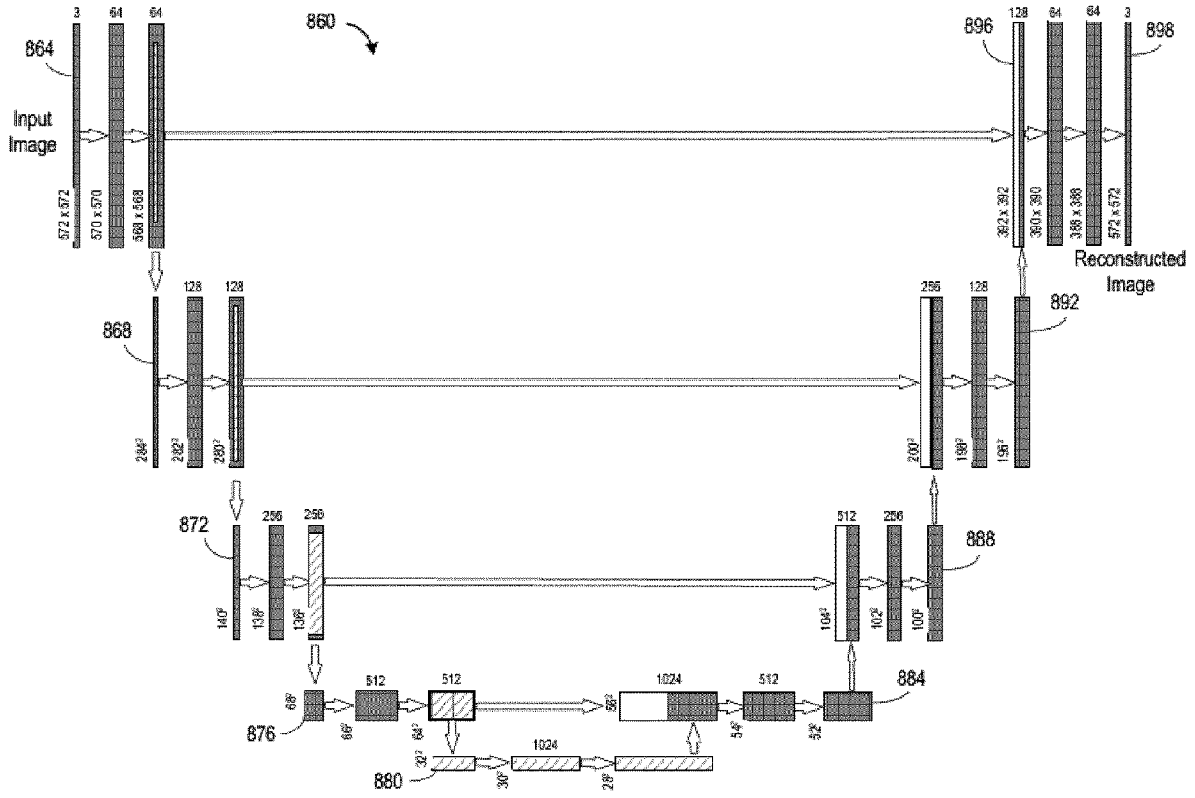

The system 100, or the EIA system 242 (in the context of endoscopy), may combine a supervised method 710 and an unsupervised method 760 during training of the machine learning methods that are used for classification of OOIs. This panel of algorithms (e.g., two or more algorithms working together) may use a U-net architecture (e.g., as shown in FIG. 8A or FIG. 8B). The training is described in the context of GI endoscopy, but it should be understood that the training may be done for other types of endoscopies, other types of medical applications and/or other imaging modalities by using a training set of images having various objects that are desired to be detected and classified.

Annotated image data sets 790 (e.g., annotated endoscopy image data sets) can also be used to train the supervised method 710. In this case the Encoder (E) 720 projects a given image into a latent feature space and builds the algorithm/feature vector 730 enabling the Classifier (C) 740 to map the feature into a distribution over the target classes and identify multiple classes based on morphological characteristics of diseases/tissue in the training images 750.

By using unlabeled images, an auxiliary Decoder (G) 770 maps a feature into a distribution over an image using a reconstruction method 780. To implement the reconstruction method 780 in the U-net architecture, the image may be broken down to pixels, and the initial pressure distribution may be obtained from detected signals using image reconstruction algorithms (e.g., as diagrammatically shown on the right side of the U-net architecture). An unsupervised method 760 may add value by enabling the feature to use a smaller number of annotated images per each class.

Reference is made to FIG. 8A, which shows a block diagram of a first example embodiment of a U-net architecture 800, which may be used by the image analysis algorithm (which may be stored in the programs 142).

A convolution block 830 receives (e.g., via the input module 144) an input image 810. The convolution block 830 consists of convolutional layers, activation layers, and pooling layers (e.g., in series). The convolution block 830 produces a feature XXX. An example of this is shown for the first convolution block 830 at the top left of FIG. 8A.

A deconvolution block receives the feature generated by one the convolution blocks and a previous deconvolution block. For example, the deconvolution block 820 at the top right of FIG. 8A receives the feature XXX generated by the convolution block 830 as well as the output of the preceding (i.e., next lower) deconvolution block. The deconvolution block 840 consists of convolutional layers, transposed convolution layers, and activation layers. The deconvolution block 840 produces an output feature 820. The output feature 820 may be, for example, an array of numbers. The deconvolution block 840 adds information to the feature that is provided to it, allowing the reconstruction of an image given the corresponding feature.

A classifier block 850 consists of convolutional layers, activation layers, and a fully connected layer. The classifier block 850 receives the feature XXX produced by the last convolution block in the series of convolution blocks. The classifier block 850 produces a class of one or more objects in an image that is being analyzed. For example, each image or region of an image may be labeled with one or several classes, such as "is a polyp" or "is not a polyp" for the example of GI endoscopy, but other classes can be used for other types of endoscopic procedures, medical procedures, and/or imaging modalities.

Reference is made to FIG. 8B, showing a block diagram of a second example embodiment of a U-net architecture 860, which may be used by the image analysis algorithm (which may be stored in the programs 142).

At 864, a first convolution layer receives (e.g., via the input module 144) an input image. The various convolution layers at this level linearly mix the input image, and only the linear part of convolution is used (e.g., for 3×3 convolution, one pixel order will be lost) in order to learn a concise feature (i.e., a representation) of the input image. This may be done by a conv 3×3, ReLu operation. The resolution of the layers is decreased after each subsequent conv 3×3 ReLu operation. For example, the resolution of the layers can go from 572×572 (having 3 channels) to 570×570 (having 64 channels) to 568×568 (having 64 channels). At the final layer, a max pool 2×2 operation may be applied to produce a convoluted layer for the next convolution layer (at 868). Additionally, a copy and crop operation may be applied to the convoluted layer for deconvolution (at 896).

At 868, a subsequent convolution layer receives the convoluted layer from the convolution layer above (from 864). The various layers linearly mix the input image, and only the linear part of the convolution is used, in order to learn a concise feature (i.e., a representation) of an input image. This is done by a conv 3×3, ReLu operation. The resolution of the layers is decreased after each subsequent conv 3×3 ReLu operation. For example, the resolution of the layers can go from 284×284 (having 64 channels) to 282×282 (having 128 channels) to 280×280 (having 128 channels). At the final layer, a max pool 2×2 operation is applied to produce a convoluted layer for the next convolution layer (at 872). Additionally, a copy and crop operation is applied to the convoluted layer for deconvolution (at 892).

At 872, another subsequent convolution layer receives the convoluted layer from the previous convolution layer above (from 868). The various layers at this level linearly mix the input image, and only the linear part of the convolution is used, in order to learn a concise feature (i.e., a representation) of an input image. This is done by a conv 3×3, ReLu operation. The resolution of the layers is decreased after each subsequent conv 3×3 ReLu operation. For example, the resolution of the layers can go from 140×140 (having 128 channels) to 138×138 (having 256 channels) to 136×136 (having 256 channels). At the final layer, a max pool 2×2 operation is applied to produce a convoluted layer for the next convolution layer (at 876). Additionally, a copy and crop operation is applied to the convoluted layer for deconvolution (at 888).

At 876, a convolution layer receives a convoluted layer from the previous convolution layer above (from 872). The various layers linearly mix the input image, and only the linear part of the convolution is used, in order to learn a concise feature (i.e., a representation) of an input image. This is done by a conv 3×3, ReLu operation. The resolution of the layers is decreased after each subsequent conv 3×3 ReLu operation. For example, the resolution of the layers can go from 68×68 (having 256 channels) to 66×66 (having 512 channels) to 64×64 (having 512 channels). At the final layer, a max pool 2×2 operation is applied to produce a convoluted layer for the next convolution layer (at 880). Additionally, a copy and crop operation is applied to the convoluted layer for deconvolution (at 884).

At 880, a convolution layer receives a feature from the convolution layer above (from 876). The various layers linearly mix the input image, and only the linear part of the convolution is used, in order to learn a concise feature (i.e., a representation) of an input image. This is done by a conv 3×3, ReLu operation. The resolution of the layers is decreased after each subsequent conv 3×3 ReLu operation. For example, the resolution of the layers can go from 32×32 (having 512 channels) to 30×30 (having 1024 channels) to 28×28 (having 512 channels). At the final layer, an up-conv pool 2×2 operation is applied to the convoluted layer for deconvolution (at 884).

The decoder 770 then performs deconvolution at 884, 888, 892, and 896. The decoder 770 reconstructs the image from a feature by adding dimensions to the feature using a series of linear transformations which maps a single dimension into 2×2 patches (up-conv). The reconstructed image is represented using RGB channels (Red, Green, Blue), for each pixel, where each value is in the range [0, . . . , 1]. A value of 0 means no intensity, and a value of 1 means full intensity. The reconstructed image is identical to the input image in dimensions and format.

At 884, a deconvolution layer receives a feature from the convolution layer below (from 880) and a cropped image from a previous convolution (from 876). These steps build a high-resolution segmentation map, with a sequence of up-convolution and concatenation with high-resolution features from a contracting path. This up-convolution uses a learned Kernel to map each feature vector to a 2×2 pixel output window and followed by non-linear activation function. For example, the resolution of the layers can go from 56×56 (having 1024 channels) to 54×54 (having 512 channels) to 52×52 (having 512 channels). At the final layer, an up-conv pool 2×2 operation is applied to the deconvoluted layer for the next deconvolution layer (at 888).

At 888, a deconvolution layer receives a deconvoluted layer from the deconvolution layer below (from 884) and a cropped image from a previous convolution (from 872). These steps build a high-resolution segmentation map, with a sequence of up-convolution and concatenation with high-resolution features from a contracting path. This up-convolution uses a learned Kernel to map each feature vector to a 2×2 pixel output window and followed by non-linear activation function. For example, the resolution of the layers can go from 104×104 (having 512 channels) to 102×102 (having 256 channels) to 100×100 (having 256 channels). At the final layer, an up-conv pool 2×2 operation is applied to the deconvoluted layer for the next deconvolution layer (at 892).

At 892, a deconvolution layer receives a deconvoluted layer from the deconvolution layer below (from 888) and a cropped image from a previous convolution (from 868). These steps build a high-resolution segmentation map, with a sequence of up-convolution and concatenation with high-resolution features from a contracting path. This up-convolution uses a learned Kernel to map each feature vector to a 2×2 pixel output window and followed by non-linear activation function. For example, the resolution of the layers can go from 200×200 (having 256 channels) to 198×198 (having 128 channels) to 196×196 (having 128 channels). At the final layer, an up-conv pool 2×2 operation is applied to the deconvoluted layer for the next deconvolution layer (at 896).

At 896, a deconvolution layer receives (e.g., via the input module 144) a deconvoluted layer from the deconvolution layer below (from 892) and a cropped image from a previous convolution (from 864). These steps build a high-resolution segmentation map, with a sequence of up-convolution and concatenation with high-resolution features from a contracting path. This up-convolution uses a learned Kernel to map each feature vector to a 2×2 pixel output window and followed by non-linear activation function. For example, the resolution of the layers can go from 392×392 (having 128 channels) to 390×390 (having 64 channels) to 388×388

(having 64 channels). At the final layer, a conv 1×1 operation is applied to the deconvoluted layer a reconstructed image (at 898).

At 898, the reconstructed image is output with the feature resulting from the convolutions. The reconstructed image is identical to the input image in dimensions and format. For example, the resolution of the reconstructed image can be 572×572 (having 3 channels).

Although FIG. 8B shows a U-net architecture with three convolutional layers, the U-net architecture may be structured in such a way that there are more convolutional layers (e.g., for different size images or for different depths of analysis).

Reference is made to FIG. 9, showing examples of endoscopy images with healthy morphological characteristics 900. The endoscopy images with healthy morphological characteristics 900 consist of, from left to right, normal cecum, normal pylorus, and normal z line. These colonoscopy images with healthy morphological characteristics 900 are taken from a Kvasir dataset. The endoscopy images with healthy morphological characteristics 900 may be used by the EIA system 242 to train the image analysis algorithms in a supervised or semi-supervised manner.

Reference is made to FIG. 10, showing examples of endoscopy images with unhealthy morphological characteristics 1000. The endoscopy images with unhealthy morphological characteristics 1000 consist of, from left to right, dyed lifted polyps, dyed resection margins, esophagitis, polyps, and ulcerative colitis. These endoscopy images with unhealthy morphological characteristics 1000 are taken from the Kvasir dataset. The endoscopy images with unhealthy morphological characteristics 1000 may be used by the EIA system 242 to train the image analysis algorithms in a supervised or semi-supervised manner. Alternatively, or in addition thereto, medical images with healthy or unhealthy morphological characteristics can be obtained from other devices/platforms such as, but not limited to, CT scanners, ultrasound devices, MRI scanners, X-ray machines, nuclear medicine imaging machines, histology imaging devices, for example, for adapting the methods and systems described herein for use in other types of medical applications.

Reference is made to FIG. 11, showing examples of unlabeled video frame images from an exclusive dataset 1100. The unlabeled video frame images from the exclusive dataset 1100 comprise both healthy and unhealthy tissue. The unlabeled video frame images from an exclusive dataset 1100 are used by the EIA system 242 to train the image analysis algorithms in a semi-supervised manner.

Reference is made to FIG. 12, showing a block diagram of an example embodiment of a report generation process 1200. The report may be generated in a certain format such as, for example, a DICOM report format. It should be noted that while the process 1200 is described as being performed by the EIA system 242, this is for illustrative purposes only and it should be understood that the system 100 may be used or another suitable processing system. However, more generally, the EIA system 242 can be considered as being an alternative example embodiment of the system 100 when used for other medical imaging applications and imaging modalities. In such a case, any reference to endoscopy, endoscopes, or endoscopic images can be replaced by other medical imaging procedures, imaging modalities, imaging devices, or medical images, respectively, such as the examples given in Table 1 and the process 1200 may be used with these other medical imaging procedures, imaging modalities, imaging devices, and medical images.

At 1210, the EIA system 242 loads the patient demographic frame. The patient demographic frame may consist of patient identifiers, such as name, date of birth, gender, and healthcare number for the patient that is undergoing the endoscopic procedure. The EIA system 242 may display the patient demographic frame on the endoscopy monitor 240. The EIA system 242 may use a still image from the endoscopy monitor 240 to collect the patient data.

At 1220, the EIA system 242 executes an optical character recognition algorithm, which may be stored in the programs 142. The EIA system 242 uses the optical character recognition algorithm to read the patient demographic frame. The optical character recognition algorithm may use a set of codes that can identify text characters in a specific position of an image. In particular, the optical character recognition algorithm may look at the boarder of an image which shows patient information.

At 1230, the EIA system 242 extracts the read patient information and uses the information for report generation.

At 1240, the EIA system 242 loads key images (i.e., video frames or images from a series of images) and/or video clips, when applicable, with annotations (e.g., from the database 150) for report generation. The key frames may be those identified by the image and annotation data matching algorithm.

At 1250, the EIA system 242 generates a report. The report may be output, for example, via the output module 148, to a display and/or may be sent via a network unit to an electronic health record system or an electronic medical record system.

Reference is made to FIG. 13, showing a block diagram of an example embodiment of a method 1300 for processing a series of images and using an image processing algorithm and annotation algorithm, which may be used by the EIA system 242. It should be noted that while the method 1300 is described as being performed by the EIA system 242, this is for illustrative purposes only and it should be understood that the system 100 may be used or another suitable processing system. However, more generally, the EIA system 242 can be considered as being an alternative example embodiment of the system 100 when used for other medical imaging applications and imaging modalities. In such a case, any reference to endoscopy, endoscopes, or endoscopic images can be replaced by other medical imaging procedures, imaging modalities, imaging devices, or medical images, respectively, such as the examples given in Table 1 and the process 1300 may be used with these other medical imaging procedures, imaging modalities, imaging devices, and medical images.

At 1310, the EIA system 242 receives a series of images 1304 and crops an image from the series of images, such as an endoscopy image from an input video stream. For example, the cropping may be done with an image processing library such as OpenCV (an open-source library). The EIA system 242 may input a raw figure and values for x min, x max, y min, and y max. OpenCV can then generate the cropped image.

At 1320, the EIA system 242 detects one or more objects in the cropped endoscopy image. Once the one or more objects are detected, their locations are determined and then classifications and confidence scores for each of the objects are determined. This may be done using a trained object detection algorithm. The architecture of this object detection algorithm may be YOLOv4. The object detection algorithm may be trained, for example, with a public database or using Darknet.

Acts 1310 and 1320 may be repeated for several images from the image series 1305.

At 1330, the EIA system 242 receives a signal (560, 562, 564) to start annotation for one or more images from the image series 1305. The EIA system 242 then performs speech recognition, speech-to-text conversion, and generates annotation data 1335, which may be done as described previously.

The method 1300 then moves to 1340, where the annotation data is added to the matching image to create an annotated image. Again, this may be repeated for several images from the image series 1305 based on commands and comments provided by the user. The annotated images may be output in an output video stream 1345.

Table 2 below shows the results of classifying tissue using a supervised method and an unsupervised method.

TABLE 2

Tissue Classification Results

| Class | supervised accuracy | semi-supervised accuracy |
|---|---|---|
| healthy/unhealthy | 0.9231 | 0.8956 |
| polyp-non_polyp | 0.8368 | 0.7881 |
| healthy/unhealthy (no dyed) | 0.8975 | 0.8608 |
| healthy/unhealthy (per class) | 0.8493 | 0.7724 |
| dyed-resection-margins | 0.8299 | 0.7699 |
| normal-cecum | 0.8849 | 0.8999 |
| normal-pylorus | 0.975 | 0.9449 |

Reference is now made to FIG. 14, which shows a chart 1400 of the training results of YOLOv4, which represents the accuracy of the speech recognition algorithm used by the EIA system 242 and shows the positive speech recognition outcome (P) rates against true positive (TP) values. The x-axis of the chart represents the number of training iterations (with one iteration being one mini-batch of images, consisting of 32 images), and the y-axis represents the TP detection rate for polyp detection using a validation group. The chart 1400 shows the TP rate starts at 0.826 at iteration 500 and increases to 0.922 after iteration 1000. Over iterations 1000 to 3000, the TP rate generally remains level at around 0.92 to 0.93. The TP can reach 0.93 after 3000 iterations.

The precision of the classification provided by the AI algorithms was chosen as an analytical metric to assess the accuracy of object detection or speech recognition. The term false positive (FP) refers to an error in which a machine learning model predicts a "true" value even when the actual observed value is "false." False negatives (FN), on the other hand, denote an error in which the machine learning model outputs the predicted value of "false" even though the actual observed value is "true." FP is a major factor that reduces the reliability of a software classification platform in the medical field when using a machine learning model. As a result, the trained object and speech recognition algorithms described herein have been validated using a metric such as precision.

Reference is made to FIG. 15, showing a block diagram of an example embodiment of a speech recognition algorithm 1500. The speech recognition algorithm 1500 may be implemented using one or more of the programs 142, the predictive engine 152, and the machine learning model 146. It should be understood that, in other embodiments, the speech recognition algorithm 1500 may be used with other medical imaging procedures, imaging modalities, imaging devices, or medical images, such as the examples given in Table 1.

The speech recognition algorithm 1500 receives raw audio data 1510 obtained through the microphone 270. The speech recognition algorithm 1500 comprises convolutional neural network blocks 1520 and a transformer block 1530. The convolutional neural network blocks 1520 receive the raw audio data 1510. The convolutional neural network blocks 1520 extract features from the raw audio data 1510 to generate feature vectors. Each convolutional neural network in the convolutional neural network blocks 1520 may be the exact same, including the weights that are used. The number of convolutional neural network blocks 1520 in the speech recognition algorithm 1500 may be dependent on the length of the raw audio data 1510.

The transformer block 1530 receives the feature vectors from the convolutional neural network blocks 1520. The transformer block 1530 produces a letter corresponding to the user input by extracting features from the feature vectors.

Reference is made to FIG. 16, showing a block diagram of an example embodiment of data flow 1600 for an object detection algorithm 1620, which may be used by the image analysis algorithm. The object detection algorithm 1620 may be implemented using one or more of the programs 142, the predictive engine 152, and the machine learning model 146. It should be understood that, in other embodiments, the object detection algorithm 1620 may be used with other medical imaging procedures, imaging modalities, imaging devices, or medical images, such as the examples given in Table 1.

The object detection algorithm 1620 receives a processed image 1610. The processed image 1610 may be a cropped and resized version of an original image.

The processed image 1610 is input into a CPSDarknet53 1630, which is a convolutional neural network that can extract features from the processed image 1610.

The output of the CSPDarknet53 1630 is provided to a spatial pyramid pooling operator 1640 and a path aggregation network 1650.

The spatial pyramid pooling operator 1640 is a pooling layer that can remove the fixed-size constraint of the CSP-Darknet53 1630. The output of the spatial pyramid pooling operator 1640 is provided to the path aggregation network 1650.

The path aggregation network 1650 processes the output from the CSPDarknet53 1630 and the spatial pyramid pooling operator 1640 by extracting features, with different depths, from the output of the CSPDarknet53 1630. The path aggregation network 1650 is output to the Yolo head 1660.

The Yolo Head 1660 predicts and produces a class 1670, a bounding box 1680, and a confidence score 1690 for an OOI. The class 1670 is the classification of the OOI. FIGS. 9-11 show various examples of images with classified objects. For example, the class 1670 may be a polyp. However, if a classification 1690 is not determined with a sufficiently high confidence score, then the image may be classified as being suspicious.

Referring now to FIG. 17, shown therein is an example embodiment of a report 1700 including an annotated image that is generated in accordance with the teachings herein. The report 1700 includes various information that is collected during the image and audio capture that occurs during the medical procedures (e.g., a medical diagnostic procedure such as an endoscopy procedure) in accordance with the teachings herein. The report 1700 generally includes various elements including, but not limited to, (a) patient data (i.e., name, birth date, etc.), (b) information about the medical procedure (e.g., date of procedure, if any biopsies were obtained, if any treatments were performed, etc.), (c) a description field for providing a description of the procedure and any findings, (d) one or more annotated images, and (e) a recommendations field including text for any recommendations for further treatment/follow-up with the patient. In other embodiments, some of the elements, other than the annotated images, may be optional. In some cases, the annotated images along with the bounding box, annotation data and confidence score can be included in the report. In other cases, the bounding box, the annotation data and/or the confidence score may not be included in the report.

In at least one embodiment described herein, the EIA system 242 or the system 100 may be configured to perform certain functions. For example, a given image may be displayed where an OOI is detected and classified and the classification is included in the given image. The user may then provide a comment in their speech where they may disagree with the automated classification provided by the EIA system 242. In this case, the user's comment is converted to a text string which is matched with the given image. Annotation data is generated using the text string and the annotation data is linked to (e.g., overlaid on or superimposed on) the given image.

In at least one embodiment, a given image may be displayed where an OOI is detected and automatically classified and the automated classification is included in the given image. The user may view the given image and may want to double-check that the automated classification is correct. In such cases, the user may provide a command to view other images that have OOIs with the same classification as the automated classification. The user's speech may include this command. Accordingly, when the speech-to-text conversion is performed, the text may be reviewed to determine whether it contains a command, such as a request for reference images with OOIs that have been classified with the same classification as the at least one OOI. A processor of the EIA system 242 or the system 100 may then retrieve the reference images from a data store, display the reference images, and receive subsequent input from the user via their speech that either confirms or dismisses the automated classification of the at least one OOI. Annotation data may be generated based on this subsequent input and then overlaid on the given image.

In at least one embodiment described herein, the EIA system 242 or the system 100 may be configured to perform certain functions. For example, a given image may be displayed where an OOI is detected and classified and the classification is included in the given image. The user may then provide a comment in their speech where they may disagree with the automated classification provided by the EIA system 242. In this case, the user's comment is converted to a text string which is matched with the given image. Annotation data is generated using the text string and the annotation data is linked to (e.g., overlaid on or superimposed on) the given image.

In at least one embodiment described herein, the EIA system 242 or the system 100 may be configured to perform certain functions. For example, a given image may be displayed where an OOI is detected but the confidence score associated with the classification is not sufficient to confidently classify the OOI. In such cases, the given image may be displayed and indicated as being suspicious, in which case input from the user may be received indicating a user classification for the at least one image with the undetermined OOI. The given image may then be annotated with the user classification.

In at least one embodiment described herein, the EIA system 242 or the system 100 may be configured to overlay a timestamp when generating an annotated image where the timestamp indicates the time that the image was originally acquired by a medical imaging device (e.g., the endoscope 220).

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

The invention claimed is:

1. A system for analyzing medical image data for a medical procedure, wherein the system comprises:

a non-transitory computer-readable medium having stored thereon program instructions for analyzing medical image data for the medical procedure; and at least one processor that, when executing the program instructions, is configured to:

receive at least one image from a series of images;

determine when there is at least one object of interest (OOI) in the at least one image and, when there is at least one OOI, determine a classification for the at least one OOI, where both determinations are performed using at least one machine learning model;

display the at least one image and any determined OOIs to a user on a display using a bounding box during the medical procedure;

receive an input audio signal including speech from the user during the medical procedure and recognize the speech;

when the speech is recognized as a comment on the at least one image during the medical procedure, convert the speech into at least one text string using a speech-to-text conversion algorithm and a terminology correction algorithm;

match the at least one text string with the at least one image for which the speech from the user was provided, by matching the at least one text string with the at least one image by comparing a timestamp associated with capture of the at least one image and a timestamp associated with reception of the input audio signal; and generate at least one annotated image in which the at least one text string is linked to the corresponding at least one image during the medical procedure;

wherein the at least one processor is further configured to, when the speech is recognized a request for at least one reference image with OOIs that have been classified with the same classification as the at least one OOI during the medical procedure:

process text generated from the speech to determine that the speech includes a command requesting the at least one reference image;

retrieve the at least one reference image from a data store;

display the at least one reference image to allow the user to compare the at least one image with at least one reference image to determine whether the classification of the at least one OOI is correct;

receive a s subsequent input from the user via speech that either confirms or dismisses the classification of the at least one OOI; and update the at least one machine learning model based on the subsequent input.

2. The system of claim 1, wherein the at least one processor is further configured to execute be terminology correction algorithm to:

cross-reference the at least one text string against a custom vocabulary of medical terms, the custom vocabulary including a plurality of key-value pairs, a key including an output string the speech-to-text conversion algorithm and a value including corresponding text from a ground-truth dataset;

calculate a matching score between the at least one text string and one or more terms in the custom vocabulary; and replace at least a portion of the at least one text string with a term from the custom vocabulary when the matching score exceeds a threshold matching score.

3. The system of claim 1, wherein the at least one processor is further configured to, when the at least one OOI is classified as being suspicious, receive input from the user indicating a user classification for the at least one image with the undetermined OOI; and/or wherein the at least one processor is further configured to automatically generate a report that includes the at least one annotated image.

4. The system of claim 1, wherein the at least one processor is further configured to, for a given OOI in a given image:

identify bounding box coordinates for a bounding box that is associated with the given OOI in the given image;

calculate a confidence score based on a probability distribution of the classification for the given OOI;

overlay the bounding box on the at least one image at the bounding box coordinates when the confidence score is higher than a confidence threshold; and upon receiving confirmation from the user during the medical procedure, overlay custom vocabulary on the at least one image.

5. The system of claim 1, wherein: (a) the at least one processor is configured to determine the classification for the OOI by:

applying a convolutional neural network (CNN) to the OOI by performing convolutional, activation, and pooling operations to generate a matrix;

generating a feature vector by processing the matrix using the convolutional, activation, and pooling operations; and performing the classification of the OOI based on the feature vector;

(b) the at least one processor is further configured to overlay a timestamp and time-stamped documentation of at least one procedural occurrence on the corresponding at least one image when generating the at least one annotated image during the medical procedure; and/or (c) the at least one processor is further configured to indicate the confidence score on the at least one image in real time on a display during the medical procedure.

6. The system of claim 1, wherein the at least one processor is configured to receive the input audio during the medical procedure by:

initiating receipt of an audio stream for the input audio from the user upon detection of a first user action that includes:

pausing a display of the series of images;

taking a snapshot of a given image in the series of images; or providing an initial voice command; and ending receipt of the audio stream upon detection of a second user action that includes:

remaining silent for a pre-determined length;

pressing a designated button; or providing a final voice command; and/or the at least one processor is further configured to store the series of images when receiving the input audio during the medical procedure, thereby designating the at least one image to receive annotation data for generating a corresponding at least one annotated image.

7. The system of claim 1, wherein the at least one processor is further configured to generate a report for the medical procedure by: capturing a set of patient information data generated during the medical procedure to be added to the report; loading a subset of the series of images that includes the at least one annotated image or the at least one OOI identified by the bounding box; and combining the set of patient information data with the subset of the series of images that includes the at least one annotated image into the report.

8. The system of claim 1, wherein the at least one processor is further configured to perform training of the at least one machine learning model by:

applying an encoder to at least one training image to generate at least one feature vector for a training OOI in the at least one training image;

selecting a class for the training OOI by applying the at least one feature vector to the at least one machine learning model; and reconstructing, using a decoder, a labeled training image by associating the at least one feature vector with the at least one training image and the selected class with which to train the at least one machine learning model.

9. The system of claim 8, wherein the class is a healthy tissue class, an unhealthy tissue class, a suspicious tissue class, or an unfocused tissue class and wherein the at least one processor is further configured to:

train the at least one machine learning model using training datasets that include labeled training images, unlabelled training images, or a mix of labelled and unlabelled training images, the images including examples categorized by healthy tissue, unhealthy tissue, suspicious tissue, and unfocused tissue.

10. The system of claim 8, wherein the at least one processor is further configured to train the at least one machine learning model by using supervised learning, unsupervised learning, or semi-supervised learning; and/or the training datasets further include subcategories for each of the unhealthy tissue and the suspicious tissue.

11. The system of claim 8, wherein the at least one processor is further configured to create the at least one machine learning model by:

receiving training images as input to the encoder;

projecting the training images, using the encoder, into features that are part of a feature space;

mapping the features, using a classifier, to a set of target classes;

identifying morphological characteristics of the training images to generate a new training dataset, the new training dataset having data linking parameters to the training images; and determining whether there is one or more mapped classes or no mapped classes based on the morphological characteristics.

12. The system of claim 11, wherein the at least one processor is further configured to determine the classification for the at least one OOI by:

receiving one or more of the features as input to the decoder;

mapping the one of the features over an unlabelled data set using a deconvolutional neural network; and reconstructing a new training image from the one of the features using the decoder to train the at least one machine learning model.

13. The system of claim 1, wherein the at least one processor is further configured to train the speech-to-text conversion algorithm using a speech dataset, the speech dataset comprising ground truth text and audio data for the ground truth text, to compare new audio data to the speech dataset to identify a match with the ground truth text; and/or wherein the speech-to-text conversion algorithm maps the at least one OOI to one of a plurality of OOI medical terms wherein the at least one processor is further configured to:

update the ground truth based on an additional user input; and correct the at least one text string with the custom vocabulary in accordance with the updated ground truth, the corrected at least one text string comprising annotation data for generation of the at least one annotated image.

14. The system of claim 1, wherein the medical image data is obtained from one or more endoscopy procedures, one or more MRI scans, one or more CT scans, one or more X-rays, one or more ultrasonographs, one or more nuclear medicine images, or one or more histology images.

15. A system for training at least one machine learning model for use with analyzing medical image data for a medical procedure and a speech-to-text conversion algorithm, wherein the system comprises:

a non-transitory computer-readable medium having stored thereon program instructions for training the machine learning model; and at least one processor that, when executing the program instructions, is configured to:

apply an encoder to at least one training image to generate at least one feature for a training object of interest (OOI) in the at least one training image;

select a class for the training OOI by applying the at least one feature to the at least one machine learning model;

reconstruct, using a decoder, a labeled training image by associating the at least one feature with the training image and the selected class with which to train the at least one machine learning model;

train the speech-to-text conversion algorithm to identify matches between new audio data and ground truth text using a speech dataset comprising the ground truth text and audio data for the ground truth text, thereby generating at least one text string;

match the at least one text string with the training image by comparing a timestamp associated with capture of the training image and a timestamp associated with reception of the new audio data, and overlay the training OOI and the at least one text string on an annotated image;

in response to speech in the new audio data is recognized as a request for at least one reference image with OOIs that have been classified with the selected class, process text generated from the speech to determine that the speech includes a command requesting the at least one reference image, retrieve the at least one reference image from a data store, display the at least one reference image to allow a user to compare the training image with the at least one reference image to determine whether classification of the training OOI is correct, receive a subsequent input from the user via speech that either confirms or dismisses the classification of the training OOI, and update the at least one machine learning model based on the subsequent input.

16. The system of claim 15, wherein the class is a healthy tissue class, an unhealthy tissue class, a suspicious tissue class, or an unfocused tissue class and wherein the at least one processor is further configured to:

train the at least one machine learning model using training datasets that include labeled training images, unlabelled training images, or a mix of labelled and unlabelled training images, the images including examples categorized by healthy tissue, unhealthy tissue, suspicious tissue, and unfocused tissue.

17. The system of claim 15, wherein the at least one processor is further configured to train the at least one machine learning model by using supervised learning, unsupervised learning, or semi-supervised learning; and/or the training datasets further include subcategories for each of the unhealthy tissue and the suspicious tissue.

18. The system of claim 15, wherein the at least one processor is further configured to create the at least one machine learning model by:

receiving training images as input to the encoder;

projecting the training images, using the encoder, into a feature space that comprises features;

mapping the features, using a classifier, to a set of target classes;

identifying morphological characteristics of the training images to generate a training dataset, the training dataset having data linking parameters to the training images; and determining whether there is one or more mapped classes or no mapped classes based on the morphological characteristics.

19. The system of claim 15, wherein the at least one processor is further configured to:

receive one or more of the features as input to the decoder;

map the one of the features over an unlabelled data set using a deconvolutional neural network; and reconstruct a new training image from the one of the features using the decoder to train the at least one machine learning model; and/or wherein the speech-to-text conversion algorithm maps the at least one OOI to one of a plurality of OOI medical terms.

20. The system of claim 15, wherein the at least one processor is further configured to: generate at least one new training image from an object of interest (OOI) detected while analyzing the medical image data when at least one text string associated with the OOI is determined to be a ground truth for that OOI based on the speech-to-text conversion algorithm producing an input audio that matches the at least one text string; and/or wherein the at least one processor is further configured to: generate at least one new training image from an object of interest (OOI) detected while analyzing the medical image data when at least one text string associated with the OOI is determined not to be a ground truth for that OOI based on the speech-to-text conversion algorithm producing an input audio that matches the at least one text string.

21. The system of claim 15, wherein the training is performed for medical image data obtained from one or more endoscopy procedures, one or more MRI scans, one or more CT scans, one or more X-rays, one or more ultrasonographs, one or more nuclear medicine images, or one or more histology images.

22. A method for analyzing medical image data for a medical procedure, wherein the method comprises:

receiving at least one image from a series of images;

determining when there is at least one object of interest (OOI) in the at least one image and, when there is at least one OOI, determining a classification for the at least one OOI, where both determinations are performed using at least one machine learning model;

displaying the at least one image and any determined OOIs to a user on a display using a bounding box during the medical procedure;

receiving an input audio signal including speech from the user during the medical procedure and recognizing the speech;

when the speech is recognized as a comment on the at least one image during the medical procedure, converting the speech into at least one text string using a speech-to-text conversion algorithm and a terminology correction algorithm;

matching the at least one text string with the at least one image for which the speech from the user was provided, by matching the at least one text string with the at least one image by comparing a timestamp associated with capture of the at least one image and a timestamp associated with reception of the input audio signal; and generating at least one annotated image in which the at least one text string is linked to the corresponding at least one image during the medical procedure;

wherein when the speech is recognized as a request for at least one reference image with OOIs that have been classified with the same classification as the at least one OOI during the medical procedure, the method further comprises:

processing texted generated from the speech determine that the speech includes a command requesting the at least one reference image, retrieving the at least one reference image from a data store;

displaying the at least one reference image to allow the user to compare the at least one image with the at least one reference image to determine whether the classification of the at least one OOI is correct;

receiving a subsequent input from the user via speech that either confirms or dismisses the classification of the at least one OOI; and updating the at least one machine learning model based on the subsequent input.

23. The method of claim 22, further comprising executing the terminology 30 rection algorithm for:

cross-referencing the at least one text string against a custom vocabulary of medical terms, the custom vocabulary including a plurality of key-value pairs, a key including an output string of the speech-to-text conversion algorithm and a value including corresponding text from a ground-truth dataset;

calculating a matching score between the at least one text string and one or more terms in the custom vocabulary; and replacing at least a portion of the at least one text string with a term from the custom vocabulary when the matching score exceeds a threshold matching score.

24. The method of claim 22, further comprising, when the at least one OOI is classified as being suspicious, receiving input from the user indicating a user classification for the at least one image with the undetermined OOI; and/or the method further comprises automatically generating a report that includes the at least one annotated image.

25. The method of claim 22, further comprising, for a given OOI in a given image:

identifying bounding box coordinates for a bounding box that is associated with the given OOI in the given image;

calculating a confidence score based on a probability distribution of the classification for the given OOI;

overlaying the bounding box on the at least one image at the bounding box coordinates when the confidence score is higher than a confidence threshold; and upon receiving confirmation from the user during the medical procedure, overlay custom vocabulary on the at least one image.

26. The method of claim 22, wherein the determining the classification for the OOI comprises:

applying a convolutional neural network (CNN) to the OOI by performing convolutional, activation, and pooling operations to generate a matrix;

generating a feature vector by processing the matrix using the convolutional, activation, and pooling operations; and performing the classification of the OOI based on the feature vector.

27. The method of claim 22, further comprising overlaying a timestamp and time-stamped documentation of at least one procedural occurrence on the corresponding at least one image when generating the at least one annotated image during the medical procedure; and/or indicating the confidence score on the at least one image in real time on a display during the medical procedure.

28. The method of claim 22, wherein the receiving the input audio during the medical procedure comprises:

(a) initiating receipt of an audio stream for the input audio from the user upon detection of a first user action that includes:

pausing a display of the series of images;

taking a snapshot of a given image in the series of images; or providing an initial voice command; and ending receipt of the audio stream upon detection of a second user action that includes:

remaining silent for a pre-determined length;

pressing a designated button; or providing a final voice command; and/or (b) storing the series of images when receiving the input audio during the medical procedure, thereby designating the at least one image to receive annotation data for generating a corresponding at least one annotated image.

29. The method of claim 22, further comprising generating a report for the medical procedure by:

capturing a set of patient information data generated during the medical procedure to be added to the report;

loading a subset of the series of images that includes the at least one annotated image or the at least one OOI identified by the bounding box; and combining the set of patient information data with the subset of the series of images that includes the at least one annotated image into the report.

30. The method of claim 29, further comprising training the speech-to-text conversion algorithm using a speech dataset, the speech dataset comprising ground truth text and audio data for the ground truth text, to compare new audio data to the speech dataset to identify a match with the ground truth text; and/or the speech-to-text conversion algorithm maps the at least one OOI to one of a plurality of OOI medical terms; further comprising updating the ground truth based on an additional user input, and correcting the at least one text string with the custom vocabulary in accordance with the updated ground truth, the corrected at least one text string comprising annotation data for generation of the at least one annotated image.

31. The method of claim 22, further comprising performing training of the at least one machine learning model by:

applying an encoder to at least one training image to generate at least one feature vector for a training OOI in the at least one training image;

selecting a class for the training OOI by applying the at least one feature vector to the at least one machine learning model; and reconstructing, using a decoder, a labeled training image by associating the at least one feature vector with the at least one training image and the selected class with which to train the at least one machine learning model; and wherein the class is a healthy tissue class, an unhealthy tissue class, a suspicious tissue class, or an unfocused tissue class.

32. The method of claim 31, further comprising:

(a) training the at least one machine learning model using training datasets that include labeled training images, unlabelled training images, or a mix of labelled and unlabelled training images, the images including examples categorized by healthy tissue, unhealthy tissue, suspicious tissue, and unfocused tissue;

(b) training the at least one machine learning model by using supervised learning, unsupervised learning, or semi-supervised learning; and/or (c) the training datasets further include subcategories for each of the unhealthy tissue and the suspicious tissue.

33. The method of claim 31, further comprising creating the at least one machine learning model by:

receiving training images as input to the encoder;

projecting the training images, using the encoder, into features that are part of a feature space;

mapping the features, using a classifier, to a set of target classes;

identifying morphological characteristics of the training images to generate a new training dataset, the new training dataset having data linking parameters to the training images; and determining whether there is one or more mapped classes or no mapped classes based on the morphological characteristics.

34. The method of claim 33, wherein the determining the classification for the at least one OOI comprises:

receiving one or more of the features as input to the decoder;

mapping the one of the features over an unlabelled data set using a deconvolutional neural network; and reconstructing a new training image from the one of the features using the decoder to train the at least one machine learning model.

35. The method of claim 22, wherein the medical image data is obtained from one or more endoscopy procedures, one or more MRI scans, one or more CT scans, one or more X-rays, one or more ultrasonographs, one or more nuclear medicine images, or one or more histology images.

* * * * *